United States Patent
Zhang et al.

(10) Patent No.: US 10,992,365 B2
(45) Date of Patent: Apr. 27, 2021

(54) BEAM SELECTION METHOD, APPARATUS AND SYSTEM

(71) Applicant: GUANGDONG OPPO MOBILE TELECOMMUNICATIONS CORP., LTD., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/458,461

(22) Filed: Jul. 1, 2019

(65) Prior Publication Data
US 2019/0349062 A1 Nov. 14, 2019

Related U.S. Application Data

(63) Continuation of application No. PCT/CN2017/083096, filed on May 4, 2017.

(30) Foreign Application Priority Data

Dec. 30, 2016 (WO) ............... PCT/CN2016/113685

(51) Int. Cl.
*H04W 72/04* (2009.01)
*H04W 16/28* (2009.01)
(Continued)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC ... H04W 72/046; H04W 88/02; H04W 72/02; H04B 7/0408
(Continued)

(56) References Cited

U.S. PATENT DOCUMENTS

| 2013/0059519 A1* | 3/2013 | Tajima | B62D 35/02 454/152 |
| 2013/0059619 A1 | 3/2013 | Kim et al. | |

(Continued)

FOREIGN PATENT DOCUMENTS

| CN | 103765794 A | 4/2014 |
| CN | 103875271 A | 6/2014 |

(Continued)

OTHER PUBLICATIONS

Huawei et al: "Beam Management Procedure for NR MIMO", R1-166089 (3GPP); Mobile Competence Centre; 650, Route Des Lucioles; F-06921 Sophia-Antipolis Cedex; vol. RAN WG1, No. Gothenburg, Sweden; Aug. 22-26, 2016; Aug. 21, 2016; XP051125206.

(Continued)

*Primary Examiner* — Luat Phung
*Assistant Examiner* — Jason A Harley

(57) ABSTRACT

Disclosed are a beam selection method, apparatus and system. The method comprises: a receiving device receives at least one set of beam associating information from a sending device, each set of which including an association relation between a first beam and at least one second beam; and selects, according to the information, a beam to be received among beams from the sending device, i.e., the receiving device may quickly select, according to the association relation between the first beam and the second beam, a beam to be received among beams from the sending device, so that the number of steps or measurements performed for the signal quality of beams during data receiving are reduced, thereby reducing the time spent on beam measurements, accelerating the process of beam measurement and selection of the receiving device, simplifying data receiving, and lowering the latency.

20 Claims, 11 Drawing Sheets

(51) Int. Cl.
| | |
|---|---|
| *H04W 72/02* | (2009.01) |
| *H04B 7/0408* | (2017.01) |
| *H04B 17/309* | (2015.01) |
| *H04B 7/06* | (2006.01) |
| *H04W 76/11* | (2018.01) |
| *H04L 5/00* | (2006.01) |
| *H04L 25/02* | (2006.01) |
| *H04W 24/10* | (2009.01) |

(52) U.S. Cl.
CPC ........ *H04L 5/0048* (2013.01); *H04L 25/0226* (2013.01); *H04W 24/10* (2013.01); *H04W 76/11* (2018.02)

(58) Field of Classification Search
USPC .......................................................... 370/329
See application file for complete search history.

(56) References Cited

U.S. PATENT DOCUMENTS

| | | | |
|---|---|---|---|
| 2016/0095102 A1 | 3/2016 | Yu et al. | |
| 2016/0183228 A1* | 6/2016 | Song | H04L 5/0023 370/330 |
| 2016/0191201 A1 | 6/2016 | Park et al. | |
| 2017/0366311 A1* | 12/2017 | Iyer | H04L 5/0007 |
| 2018/0324738 A1* | 11/2018 | Stirling-Gallacher | H04B 7/0617 |

FOREIGN PATENT DOCUMENTS

| | | | |
|---|---|---|---|
| CN | 106160807 A | 11/2016 | |
| CN | 106162673 A | 11/2016 | |
| KR | 20130025102 A | 3/2013 | |
| RU | 2406263 C2 | 12/2010 | |

OTHER PUBLICATIONS

Huawei et al. "Access mechanism for beam based approach", R1-166088 (3GPP); Mobile Competence Centre; 650, Route Des Lucioles; F-06921 Sophia-Antipolis Cedex; vol. RAN WG1, No. Gothenburg, Sweden; Aug. 22-26, 2016; Aug. 21, 2016; XP051125205.
The partial supplementary European search report dated Dec. 13, 2019.
International Search Report (ISR) dated Oct. 10, 2017 for Application No. PCT/CN2017/083096.
International Search Report (ISR) dated Sep. 15, 2017 tor Application No. PCT/CN2016/11368.
Samsung, 3GPP TSG RAN WG1 Meeting #87 R1-1612463; Discussion on beam sweeping for initial access signals, Reno, USA Nov. 14-18, 2016.
The first Office Action of corresponding Russian application No. 2019123979, dated Jun. 26, 2020.
The first Office Action of corresponding Canadian application No. 3048932, dated Aug. 11, 2020.
The EESR of corresponding European application No. 17889008.3, dated Mar. 17, 2020.
The first Office Action of corresponding Chilean application No. 201901813, dated Sep. 28, 2020.
The first Office Action of corresponding Indian application No. 201917030671, dated Nov. 23, 2020.
The first Office Action of corresponding Korean application No. 10-2019-7022502, dated Jan. 28, 2021.

* cited by examiner

BEAM SELECTION METHOD, APPARATUS AND SYSTEM

CROSS-REFERENCE TO RELATED APPLICATIONS

This application is a continuation of International Application No. PCT/CN2017/083096, filed on May 4, 2017, entitled "Beam Selection Method, Apparatus and System", which claims priority to International Application No. PCT/CN2016/113685, filed on Dec. 30, 2016, entitled "Beam Selection Method, Apparatus and System", the disclosures of both applications are hereby incorporated by reference in their entireties.

TECHNICAL FIELD

The present disclosure relates to the field of communication, and in particular, to a beam selection method, apparatus and system.

BACKGROUND

The 5th generation mobile communication (5G) system is also known as the new radio (NR) system, which introduces beamforming as one of its key technologies.

Beamforming refers to the formation of specific spatial directivity by superimposing signals transmitted by multiple antennas by assigning specific weights to these antennas. In a 5G system, a sending device can send beam signals to multiple receiving devices simultaneously through different beams, thereby realizing reuse of the same time-frequency resources in different spaces (i.e., space division multiplexing), greatly increasing system capacity.

Accordingly, in a 5G system, a receiving device may simultaneously detect multiple beams sent by the sending device, and before receiving the data sent by the sending device, the receiving device needs to separately perform measurements on the multiple beams sent by the sending device to identify the beam with good signal quality among the multiple beams for the receiving, and the process of performing measurements on multiple beams sent by the sending device separately requires more measurement time, resulting in high complexity and latency of data reception.

SUMMARY

Embodiments of the present disclosure provide a beam selection method, device and system for solving the problem that the receiving device separately performing measurements on the multiple beams sent by the sending device requires a large amount of measurement time, resulting in high complexity and latency of data reception. The technical solution is as follows.

According to a first aspect of the embodiments of the present disclosure, a beam selection method is provided, the method including:

receiving, by a receiving device, at least one set of beam associating information sent by a sending device, each set of the beam associating information including an association relation between a first beam and at least one second beam;

selecting, by the receiving device, according to the at least one set of beam associating information, a beam to be received among beams sent by the sending device.

In an optional embodiment, the association relation between the first beam and the at least one second beam includes:

an association relation between a beam ID of the first beam and a beam ID of the at least one second beam; and/or an association relation between a physical resource associated with the first beam and a physical resource associated with each of the at least one second beam; and/or an association relation between a reference signal associated with the first beam and a reference signal associated with each of the at least one second beam.

In an optional embodiment, the reference signal includes:

a Demodulation Reference Signal (DMRS) used by an uplink physical channel of an associated beam transmission, and/or a channel Sounding Reference Signal (SRS) used by an uplink physical channel of an associated beam transmission;

or, a Demodulation Reference Signal (DMRS) used by a downlink physical channel of an associated beam transmission, and/or a beam specific reference signal (RS) of an associated beam, and/or a channel state information-reference signal (CSI-RS) of an associated beam.

In an optional embodiment, the association relation between the first beam and the at least one second beam further includes:

a first physical channel associated with the at least one second beam, and a second physical channel associated with the first beam.

In an optional embodiment, the selecting, by the receiving device, according to the at least one set of beam associating information, a beam to be received among beams sent by the sending device, includes:

when the receiving device receives the first physical channel through a second beam, selecting the first beam associated with the second beam as a beam for receiving the second physical channel according to the at least one set of beam associating information.

In an optional embodiment, the selecting, by the receiving device, according to the at least one set of beam associating information, a beam to be received among beams sent by the sending device, includes:

when the receiving device receives the second physical channel through a first beam, measuring signal quality of at least one second beam associated with the first beam according to the at least one set of beam associating information; and selecting, by the receiving device, a second beam with the optimal signal quality among the at least one second beam associated with the first beam as a beam for receiving the first physical channel.

In an optional embodiment, the first physical channel is a downlink data channel, and the second physical channel is a downlink control channel; or the first physical channel is an uplink data channel, and the second physical channel is an uplink control channel.

In an optional embodiment, the receiving, by a receiving device, at least one set of beam associating information sent by a sending device, includes: receiving, by the receiving device, the at least one set of beam associating information sent by the sending device through dedicated signaling or broadcast signaling.

In an optional embodiment, the receiving device is a terminal, and the sending device is an access network device; or the receiving device is an access network device, and the sending device is a terminal.

According to a second aspect of the embodiments of the present disclosure, a beam selection method is provided, the method including:

generating, by a sending device, at least one set of beam associating information, where each set of the beam associating information includes an association relation between a first beam and at least one second beam;

sending, by the sending device, the at least one set of beam associating information to the receiving device, enabling the receiving device to select a beam to be received among beams sent by the sending device according to the at least one set of beam associating information.

In an optional embodiment, the association relation between the first beam and the at least one second beam includes:

an association relation between a beam ID of the first beam and a beam ID of the at least one second beam; and/or an association relation between a physical resource associated with the first beam and a physical resource associated with each of the at least one second beam; and/or an association relation between a reference signal associated with the first beam and a reference signal associated with each of the at least one second beam.

In an optional embodiment, the reference signal includes:

a Demodulation Reference Signal (DMRS) used by an uplink physical channel of an associated beam transmission, and/or a channel Sounding Reference Signal (SRS) used by an uplink physical channel of an associated beam transmission;

or, a Demodulation Reference Signal (DMRS) used by a downlink physical channel of an associated beam transmission, and/or a beam specific reference signal (RS) of an associated beam, and/or a channel state information-reference signal (CSI-RS) of an associated beam.

In an optional embodiment, the association relation between the first beam and the at least one second beam further includes:

a first physical channel associated with the at least one second beam, and a second physical channel associated with the first beam.

In an optional embodiment, the first physical channel is a downlink data channel, and the second physical channel is a downlink control channel; or the first physical channel is an uplink data channel, and the second physical channel is an uplink control channel.

In an optional embodiment, the sending, by the sending device, the at least one set of beam information to the receiving device, includes:

Sending, by the sending device, the at least one set of beam associating information to the receiving device through dedicated signaling or broadcast signaling.

In an optional embodiment, the receiving device is a terminal, and the sending device is an access network device; or the receiving device is an access network device, and the sending device is a terminal.

According to a third aspect of the embodiments of the present disclosure, a beam selection method is provided, the method includes:

receiving, by a receiving device, at least one set of beam associating information sent by a sending device, where each set of the beam associating information includes an association relation between a beam where a first signal is borne and a beam where a second signal is borne;

selecting, by the receiving device, a beam to be received among beams sent by the sending device according to the at least one set of beam associating information.

In an optional embodiment, the beam where the first signal is borne is the same beam as the beam where the second signal is borne.

In an optional embodiment, the receiving, by a receiving device, at least one set of beam associating information sent by a sending device, includes:

receiving, by the receiving device, a Quasi Co-Located parameter sent by the sending device, and acquiring the at least one set of beam associating information indicated by the Quasi Co-Located parameter;

or, receiving, by the receiving device, the at least one set of beam associating information sent by the sending device through dedicated signaling.

In an optional embodiment, the first signal is a synchronization signal block (SS block); and the second signal includes at least one of a paging signal, a channel state information reference signal (CSI-RS), and a Demodulation Reference Signal (DMRS).

In an optional embodiment, when the second signal includes a channel state information reference signal (CSI-RS), the association relation includes:

an association relation between an SS block and a CSI-RS resource;

and/or an association relation between an SS block and a CSI-RS port.

In an optional embodiment, when the second signal includes a Demodulation Reference Signal (DMRS), the association relation includes:

an association relation between an SS block and a DMRS port or port set.

In an optional embodiment, the selecting, by the receiving device, a beam to be received among beams sent by the sending device according to the at least one set of beam associating information, includes:

acquiring, by the receiving device, the signal quality of each of the beams obtained by performing measurement on the first signal in each of the beams;

querying, by the receiving device, according to the at least one set of beam associating information, a second signal associated with the first signal in a beam with the optimal signal quality among the beams;

selecting, by the receiving device, the beam with the optimal signal quality as a beam for receiving the second signal associated with the first signal in the beam with the optimal signal quality.

According to a fourth aspect of the embodiments of the present disclosure, a beam selection method is provided, the method includes:

generating, by a sending device, at least one set of beam associating information, each set of the beam associating information includes an association between a beam where a first signal is borne and a beam where a second signal is borne;

sending, by the sending device, the at least one set of beam associating information to a receiving device, enabling the receiving device to select a beam to be received among beams sent by the sending device according to the at least one set of beam associating information.

In an optional embodiment, the beam where the first signal is borne is the same beam as the beam where the second signal is borne.

In an optional embodiment, the sending, by the sending device, the at least one set of beam associating information to the receiving device, includes:

sending, by the sending device, a Quasi Co-Located parameter indicating the at least one set of beam associating information to the receiving device;

or, sending, by the sending device, dedicated signaling including the at least one set of beam associating information to the receiving device.

In an optional embodiment, the first signal is a synchronization signal block (SS block); and the second signal includes at least one of a paging signal, a channel state information reference signal (CSI-RS), and a Demodulation Reference Signal (DMRS).

In an optional embodiment, when the second signal includes a channel state information reference signal (CSI-RS), the association relation includes:

an association relation between an SS block and a CSI-RS resource;

and/or, an association relation between an SS block and a CSI-RS port.

In an optional embodiment, when the second signal includes a Demodulation Reference Signal (DMRS), the association relation includes:

an association relation between an SS block and a DMRS port or port set.

According to a fifth aspect of the embodiments of the present disclosure, a beam selection apparatus is provided, the beam selection apparatus includes at least one unit, wherein the at least one unit is configured to implement the beam selection method provided by the first aspect or any of the optional implementations of the first aspect.

According to a sixth aspect of the embodiments of the present disclosure, a beam selection apparatus is provided, the beam selection apparatus includes at least one unit, wherein the at least one unit is configured to implement the beam selection method provided by the second aspect or any of the optional implementations of the second aspect.

According to a seventh aspect of the embodiments of the present disclosure, a beam selection apparatus is provided, the beam selection apparatus includes at least one unit, wherein the at least one unit is configured to implement the beam selection method provided by the third aspect or any of the optional implementations of the third aspect.

According to an eighth aspect of the embodiments of the present disclosure, a beam selection apparatus is provided, the beam selection apparatus includes at least one unit, wherein the at least one unit is configured to implement the beam selection method provided by the forth aspect or any of the optional implementations of the forth aspect.

According to a ninth aspect of the embodiments of the present disclosure, a receiving device is provided, the receiving device includes a processor, a memory, a transmitter and a receiver; the processor is configured to store one or more instructions, the instructions are instructed to be executed by the processor, the processor is configured to implement the beam selection method provided by the first aspect or any of the optional implementations of the first aspect, or the processor is configured to implement the beam selection method provided by the third aspect or any of the optional implementations of the third aspect; the receiver is configured to implement reception of beam associating information.

According to a tenth aspect of the embodiments of the present disclosure, a sending device is provided, the sending device includes a processor, a memory, a transmitter, and a receiver; the processor is configured to store one or more instructions, the instructions are instructed to be executed by the processor, the processor is configured to implement the beam selection method provided by the second aspect or any of the optional implementations of the second aspect, or the processor is configured to implement the beam selection method provided by the forth aspect or any of the optional implementations of the forth aspect; the receiver is configured to implement reception of beam associating information.

According to an eleventh aspect of the embodiments of the present disclosure, a computer readable medium is provided, the computer readable medium stores one or more instructions, the instruction is configured to implement the beam selection method provided by the first aspect or any of the optional implementations of the first aspect; or the instruction is configured to implement the beam selection method provided by the second aspect or any of the optional implementations of the second aspect; or the instruction is configured to implement the beam selection method provided by the third aspect or any of the optional implementations of the third aspect; or the instruction is configured to implement the beam selection method provided by the forth aspect or any of the optional implementations of the forth aspect.

According to a twelfth aspect of the embodiments of the present disclosure, a beam selection system is provided, the beam selection system may include a receiving device and a sending device. Wherein the receiving device may be a device that includes the beam selection apparatus provided in the fifth aspect, and the sending device may be a device that includes the beam selection apparatus provided in the sixth aspect; or the receiving device may be a device that includes the beam selection apparatus provided in the seventh aspect, the sending device may be a device that includes the beam selection apparatus provided in the eighth aspect.

According to a thirteenth aspect of the embodiments of the present disclosure, a beam selection system is provided, the beam selection system may include the receiving device provided in the tenth aspect and the sending device provided in the eleventh aspect.

The beneficial effects of the technical solutions provided by the embodiments of the present disclosure are:

the sending device sends the association relation between the first beam and the second beam to the receiving device, and the receiving device, in the process of receiving the data sent by the sending device, may quickly selects, according to the association relation between the first beam and the second beam sent by the sending device, a beam to be received among beams sent by the sending device, so that the step or times for measuring the signal quality of beams during data receiving process are reduced, thereby reducing the time spent on measuring beams, accelerating the process of beam measurement and selection of the receiving device, simplifying the complexity of data receiving, and lowering the latency of data receiving.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure, other drawings may also be obtained by those of ordinary skill in the art without any creative work according to these drawings.

DETAILED DESCRIPTION OF THE EMBODIMENTS

In order to make the objectives, technical schemes and advantages of the present disclosure more clear, implementations of the present disclosure will be further described in detail below with reference to the accompanying drawings.

A "module" as used herein generally refers to a program or instruction stored in a memory and is capable of performing particular functions; "unit" as used herein generally refers to a functional structure that is logically divided, the "unit" can be implemented by hardware alone or a combination of hardware and software.

"Multiple" as used herein means two or more. "and/or" describes the association relationship of the associated objects, indicating that there may be three relationships, for example, A and/or B, which may indicate that there are three cases: A existing alone, A and B existing together, and B existing alone. The character "/" generally indicates that the contextual object is an "or" relation.

Figure 1:
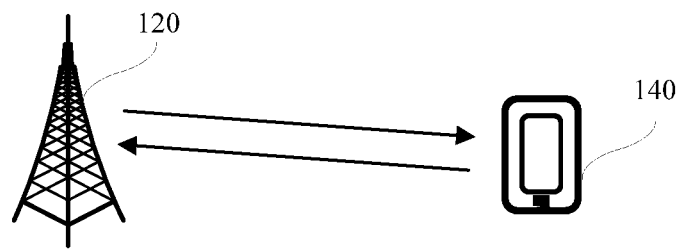
FIG. 1 is a schematic structural diagram of a mobile communication system according to an embodiment of the present disclosure.

Please refer to FIG. 1, which is a schematic structural diagram of a mobile communication system according to an embodiment of the present disclosure. The mobile communication system can be a 5G system, also known as an NR system. The mobile communication system includes an access network device 120 and a terminal 140.

The access network device 120 may be a base station. For example, the base station may be a base station (gNB) adopting a centralized distributed architecture in a 5G system. When the access network device 120 adopts a centralized distributed architecture, it generally includes a central unit (CU) and at least two distributed units (DUs). The central unit is provided with a Packet Data Convergence Protocol (PDCP) layer, a Radio Link Control (RLC) layer, and a Media Access Control (MAC) layer protocol stack; and the distributed unit is provided with a physical (PHY) layer protocol stack. The specific implementation manner of the access network device 120 is not limited in the embodiment of the present disclosure.

The access network device 120 and the terminal 140 establish a wireless connection through a wireless air interface. In an embodiment, the wireless air interface is a wireless air interface based on the fifth generation mobile communication network technology (5G) standard. For example, the wireless air interface may be a new radio (NR); or the wireless air interface may alternatively be a wireless air interface based on the next generation of 5G mobile communication network technology standards.

The terminal 140 may be a device that provides voice and/or data connectivity to a user. The terminal can communicate with one or more core networks via a Radio Access Network (RAN). The terminal 140 can be a mobile terminal, such as a mobile phone (or "cellular" phone) and a computer with a mobile terminal. For example, it can be a portable, pocket, handheld, computer built-in or in-vehicle mobile device, e.g., a subscriber unit, a subscriber station, a mobile station, a mobile, a remote station, an access point, a remote terminal, an access terminal, a user terminal, a user agent, a user device, or user equipment.

It should be noted that, in the mobile communication system shown in FIG. 1, a plurality of access network devices 120 and/or a plurality of terminals 140 may be included, and one access network device 120 and one terminal 140 are shown in FIG. 1 as an example, but this embodiment is not limited thereto.

In a 5G system, a sending device can send data to a receiving device in a specific direction through a beam. The sending device may be the access network device 120 in the mobile communication system as shown in FIG. 1, and the receiving device may be the terminal 140. In this instance, the beam sent by the sending device to the receiving device may be referred to as a downlink beam. Or, the sending device may be the terminal 140 in the mobile communication system as shown in FIG. 1 above, and the receiving device may be the access network device 120. In this instance, the beam sent by the sending device to the receiving device may be referred to as an uplink beam.

The width of different beams sent by the sending device can be different. For example, in the embodiment of the present disclosure, the beam sent by the sending device may be categorized into two types: a first beam and a second beam. In an embodiment, one first beam may cover at least one second beam.

In a scheme of the present disclosure, a first beam covers at least one second beam, that is, the first beam spatially covers at least one second beam, or the coverage of the at least one second beam is within the coverage of the first beam. In some scenarios, the first beam may be referred to as a wide beam, the second beam may be referred to as a narrow beam, or the first beam may be referred to as a large beam, and the second beam may be referred to as a small beam. The specific naming of the first beam and the second beam is not limited in the embodiment of the present disclosure.

Different types of beams can transmit different physical channels. For example, the second beam can be used to transmit a data channel, so that the number of beams used for transmitting the data channel is larger, enabling more effective space division multiplexing while expanding system capacity. The first beam can be used to transmit a common channel or control channel to increase the coverage of the common channel or control channel. Of course, the embodiments of the present disclosure do not limit the physical channels to be transmitted by various types of beams. For example, in practical applications, the first beam may also be used to transmit a data channel, and the second beam may also be used to transmit a common channel or a control channel. In another possible implementation manner, the foregoing first beam may also not correspond to a specific physical channel.

Figure 2:
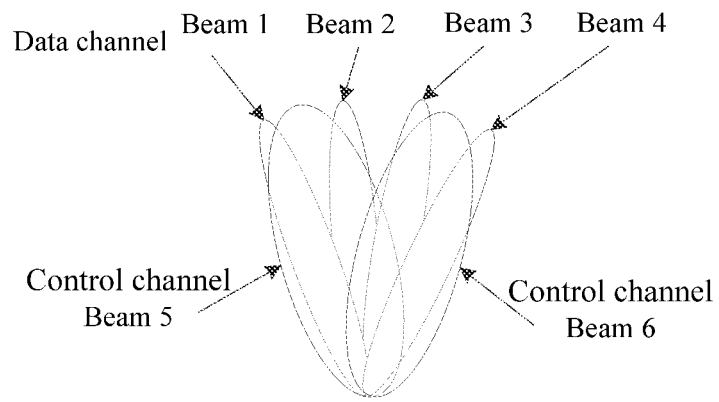
FIG. 2 is a schematic diagram of a beam provided by an embodiment of the present disclosure.

Specifically, please refer to FIG. 2, which shows a schematic diagram of a beam provided by an embodiment of the present disclosure. As shown in FIG. 2, the sending device sends six beams, which are beam 1 to beam 6, respectively, where beam 1 to beam 4 are second beams, that is, narrow beams, and beam 5 and beam 6 are first beams, that is, wide beams. Also, beam 5 covers beam 1 and beam 2, and beam 6 covers beam 3 and beam 4. The sending device can send data of the data channel through the beam 1 to the beam 4, and send the data of the control channel through the beam 5 and the beam 6.

Figure 3:
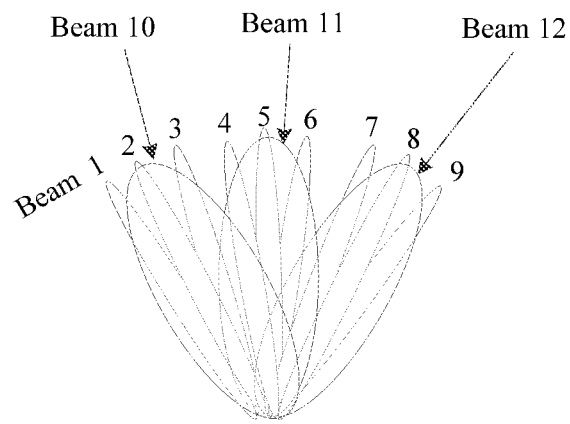
FIG. 3 is a schematic diagram of another beam provided by an embodiment of the present disclosure.

The schematic diagram shown in FIG. 2 is an example in which the sending device sends six beams and one first beam covers two second beams. In practical applications, the number of beams sent by the sending device is not limited to six, and the number of second beams covered by one first beam is not limited to two, that is, the number of beams sent by the sending device may be more or less, and the number of second beams covered by one first beam may also be more or less. For example, please refer to FIG. 3, which is a schematic diagram of a beam according to an embodiment of the present disclosure. As shown in FIG. 3, the sending device sends 12 beams, which are beam 1 to beam 12, and beam 1 to beam 9 are second beams, that is, narrow beams, while beam 10 to the beam 12 are first beams, that is, wide beams. Also, beam 10 covers beam 1 to beam 3, beam 11 covers beam 4 to beam 6, and beam 12 covers beam 7 to beam 9.

Figure 4:
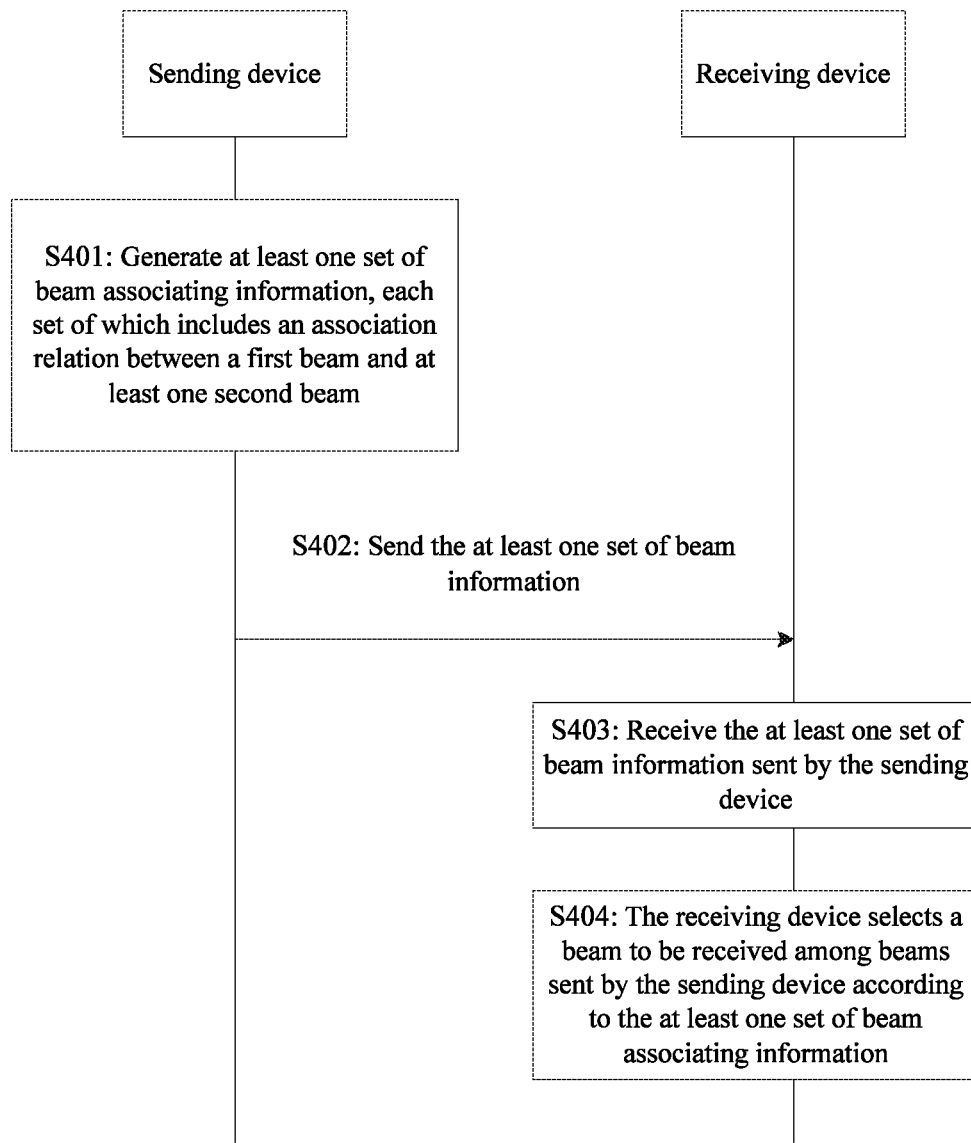
FIG. 4 is a flowchart of a beam selection method according to an embodiment of the present disclosure.

Please refer to FIG. 4, which shows a flowchart of a beam selection method according to an embodiment of the present disclosure. This embodiment is exemplified by applying the beam selection method to the mobile communication system shown in FIG. 1. The method includes:

Step 401: a sending device generates at least one set of beam associating information, where each set of the beam associating information includes an association relation between a first beam and at least one second beam.

The first beam and the second beam may be beams sent by the sending device, and the first beam covers the associated at least one second beam.

In an embodiment, when generating the beam associating information, the sending device generates beam associating information according to the coverage relation between the first beam and the second beam that is sent by the sending device, that is, generates the association relation between the first beam and at least one second beam covered by the first beam.

For example, taking FIG. 2 as an illustration, where beam 5 covers beam 1 and beam 2, beam 6 covers beam 3 and beam 4, and the sending device can generate an association relation between beam 5 and beam 1 and beam 2 as one set of beam associating information, and another association relation between beam 6 and beam 3 and beam 4 as another set of beam associating information.

Or, taking FIG. 3 as an example, where beam 10 covers beam 1 to beam 3, beam 11 covers beam 4 to beam 6, and beam 12 covers beam 7 to beam 9, and the sending device can generate an association relation between beam 10 and beam 1 and beam 3 as a set of beam associating information, an association relation between beam 11 and beam 4 to beam 6 as another set of beam associating information, and an association relation between beam 12 and beam 7 to beam 9 as yet another set of beam associating information.

In the embodiment of the present disclosure, the association relation between the first beam and the at least one second beam in the set of beam associating information may be a explicit association relation or an implicit association relation.

The explicit association may be an association relation between the beam IDs of the first beam and the at least one second beam.

Or, the implicit association relation may be an association relation between a physical resource associated with the first beam and physical resources associated with each of the at least one second beam. The physical resource may be at least one of a time domain resource, a frequency domain resource, and a code domain resource.

And/or, the implicit association relation may be an association relation between a reference signal associated with the first beam and reference signals associated with each of the at least one second beam.

And/or, the implicit association relation may be an association between a physical resource associated with the first beam and a reference signal associated with each of the at least one second beam.

And/or, the implicit association relation may be an association between a reference signal associated with the first beam and a physical resource associated with each of the at least one second beam.

Of course, in a practical application, an association relation between the first beam and the at least one second beam in a set of beam associating information may simultaneously include the explicit association relation and the implicit association relation. In other words, for a set of association relation, indications may be made in a form including both explicit and implicit association relations.

In an embodiment of the present disclosure, when the first beam and the second beam are used to transmit different physical channels, the association relation between the first beam and the at least one second beam may include a first physical channel associated with the at least one second beam, and a second physical channel associated with the first beam.

Specifically, the association relation between the first beam and the at least one second beam includes: an identifier of the first physical channel associated with the at least one second beam, and an identifier of the second physical channel associated with the first beam.

Or, the association relation between the first beam and the at least one second beam includes: a channel type of the first physical channel associated with the at least one second beam, and a channel type of the second physical channel associated with the first beam.

For example, the second beam is used to transmit a data channel, and the first beam is used to transmit a control channel. When the first beam and the second beam are downlink beams, for example, the sending device is an access network device and the receiving device is a terminal, the first physical channel is a downlink data channel, and the second physical channel is a downlink control channel. Accordingly, when the first beam and the second beam are uplink beams, for example, the sending device is a terminal and the receiving device is an access network device, the first physical channel is an uplink data channel, and the second physical channel is an uplink control channel, and the sending device indicates, by the beam associating information, that the physical channel is associated with the first beam and the physical channel is associated with the second beam to the receiving device.

In an embodiment, when the first beam and the second beam are uplink beams, the reference signals used in the implicit association relation include: DMRS used by uplink physical channels of associated beam transmissions, and/or SRS used by the uplink physical channel of associated beam transmissions.

Or, when the first beam and the second beam are downlink beams, the reference signal used in the implicit association relation includes: DMRS used by a downlink physical channel of associated beam transmissions, and/or beam specific RS of associated beams, and/or CSI-RS of associated beams.

In practical applications, the reference signals used in the implicit association relation are not limited to the above four, i.e., DMRS, SRS, beam specific RS, and CSI-RS. The sending device may also select other reference signals according to actual usage scenarios to indicate the association relation between the first beam and the second beam. Meanwhile, these reference signals can also be replaced by other reference signals serving the same or similar pilot functions but having different names.

Step 402: the sending device sends at least one set of beam associating information to the receiving device.

In an embodiment, the sending device sends the at least one set of beam associating information through dedicated signaling or broadcast signaling. For example, when the sending device is an access network device, the sending device may send the at least one set of beam associating information through dedicated signaling or broadcast signaling; when the sending device is a terminal, the sending device may send the at least one set of beam associating information through dedicated signaling.

The dedicated signaling may be Radio Resource Control (RRC) signaling, etc., and the broadcast signaling may be system information broadcasting, etc.

Step 403: the receiving device receives at least one set of beam associating information sent by the sending device.

Accordingly, the receiving device receives the at least one set of beam associating information sent by the sending device through dedicated signaling or broadcast signaling. For example, when the sending device is an access network device, the receiving device may receive the at least one set of beam associating information through dedicated signaling or broadcast signaling; when the sending device is a terminal, the receiving device may receive the at least one set of beam associating information through dedicated signaling.

Step 404: the receiving device selects a beam to be received among beams sent by the sending device according to the at least one set of beam associating information.

In the embodiment of the present disclosure, receiving a beam may mean receiving data or signaling in a physical channel transmitted through the beam. Accordingly, receiving a channel, as will be described in the following, may mean receiving data or a signaling in that channel.

In the embodiment of the present disclosure, the scenario of the receiving device selecting a beam to be received among beams sent by the sending device according to the at least one set of beam associating information may include, but not limited to, the following three cases.

In a first case, when the receiving device receives a first physical channel through a second beam, a first beam associated with the second beam may be selected as a beam for receiving the second physical channel according to the at least one set of beam associating information.

For example, the first beam is used for transmitting a control channel, and the second beam is used for transmitting a data channel. When the receiving device is receiving the data channel through a second beam, if the receiving device needs to receive the control channel, it can quickly select the first beam associated with the second beam according to the received beam associating information, and does not need to separately measure each first beam sent by the sending device, thereby reducing the steps of measurements on the signal quality of the beams during data receiving process.

In a second case, when the second physical channel is being received through the first beam, the receiving device measures the signal quality of the at least one second beam associated with the first beam according to the at least one set of beam associating information, and selects the second beam with the beat signal quality in the at least one second beam associated with the first beam as the beam for receiving the first physical channel.

For example, the first beam is used for transmitting the control channel, and the second beam is used for transmitting the data channel. When the receiving device is receiving the control channel through the first beam, if the receiving device needs to receive the data channel, it may determine a part of the second beam associated with the first beam according to the received beam associating information, and select a second beam with the optimal signal quality from the determined part of second beam for receiving the data channel, without any need to measure all the second beams sent by the sending device separately, thereby reducing the number of measurements to be performed on the signal quality of the beam during data reception.

In a third case, when the at least one set of beam associating information includes at least two sets of beam associating information, the receiving device measures signal quality of the first beam of each of the at least two sets of beam associating information, and then measures the signal quality of the at least one second beam associated with the first beam with the optimal signal quality among the first beam of each of the at least two sets of beam associating information, and selects the second beam with the optimal signal quality among the at least one second beam associated with the first beam as the received beam.

Through the above method, when the sending device sends multiple second beams in the direction in which the receiving device is located, the receiving device does not need to perform signal quality measurement on each of the multiple second beams. Rather, it only need to perform measurement on the first beam covering the multiple second beams, find a first beam with the optimal signal quality, and at least one second beam covered by the first beam with the optimal signal quality can be taken as the set of second beams with the optimal signal quality. The receiving device then performs measurement on the set of second beams with the optimal signal quality and selects the second beam with the optimal signal quality. Compared with performing measurement of the signal quality for each of the second beams separately, the present solution can reduce the number of measurements performed about the signal quality of the beam during data reception process.

In summary, in the beam selection method shown in the embodiment of the present disclosure, the sending device sends the association relation between the first beam and the second beam to the receiving device, and the receiving device may, while receiving the data sent by the sending device, quickly select according to the association relation between the first beam and the second beam sent by the sending device, a beam to be received among beams sent by the sending device, so that the steps or number for measuring the signal quality of beams during data receiving process are reduced, thereby reducing the time spent on performing measurements on the beams, accelerating the process of beam measurement and selection of the receiving device, simplifying the complexity of data receiving, and lowering the latency of data receiving.

It should be noted that the steps performed by the receiving device in the embodiment shown in FIG. 4 may be separately implemented as a beam selecting method on the receiving device side, and the steps performed by the sending device in the foregoing embodiments may be separately implemented as a beam selection method on the sending device side.

Figure 5:
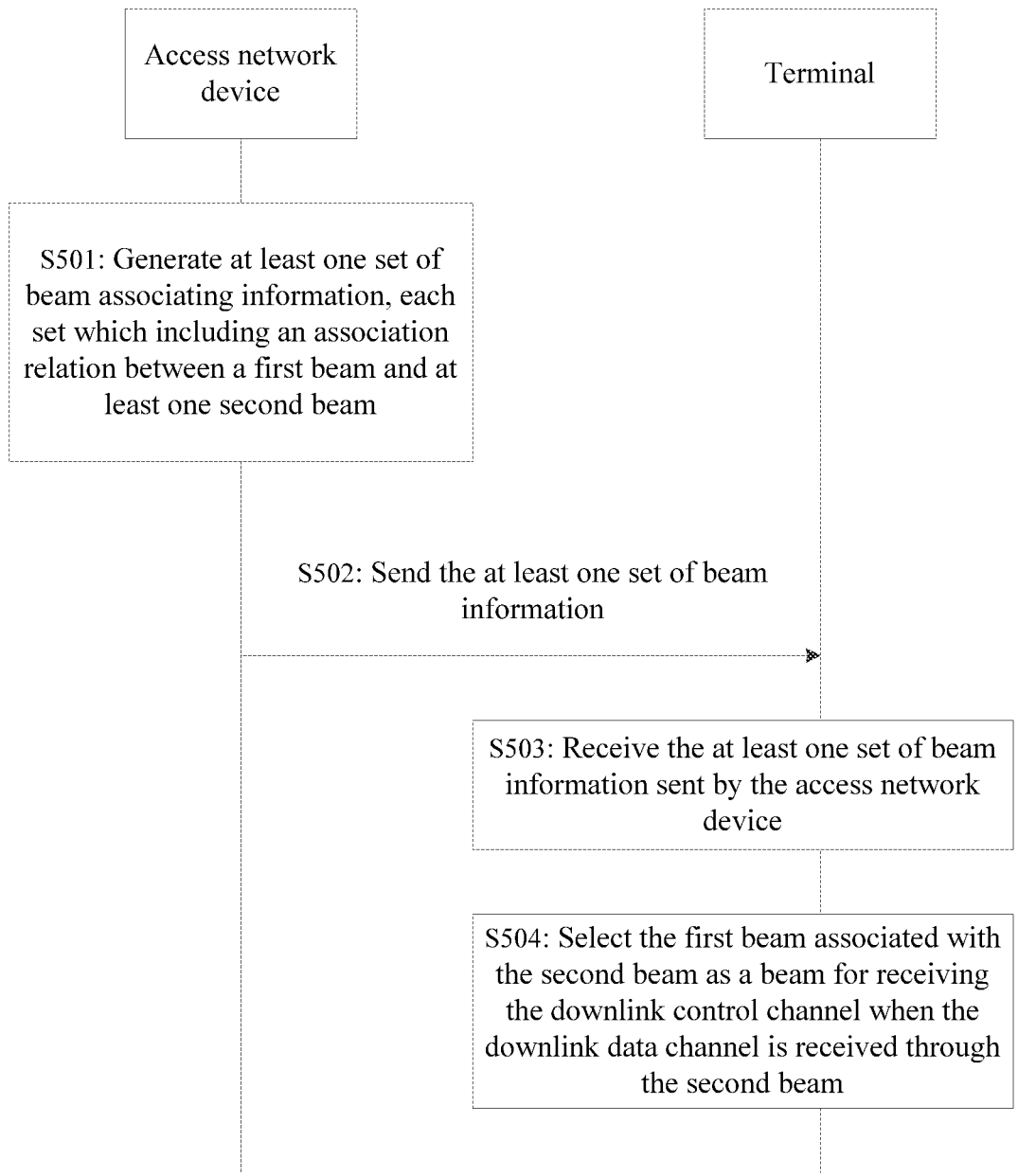
FIG. 5 is a flowchart of another beam selection method according to an embodiment of the present disclosure.

Please refer to FIG. 5, which is a flowchart of a beam selection method according to an embodiment of the present disclosure. In this embodiment, as an example for illustration, the beam selection method is applied to the mobile communication system shown in FIG. 1, the sending device is an access network device, the receiving device is a terminal, and the access network device sends a downlink data channel through a second beam, and sends a downlink control channel through a first channel. The method includes:

Step 501: the access network device generates at least one set of beam associating information, where each set of beam associating information includes an association relation between a first beam and at least one second beam.

In an embodiment of the present disclosure, the association relation between the first beam and the at least one second beam further includes at least one downlink data channel associated with the second beam, and a downlink control channel associated with the first beam.

Or, the association relation between the first beam and the at least one second beam may also include an identifier or a channel type of the uplink physical channel associated with the at least one second beam, and/or an identifier or a channel type of the uplink physical channel associated with the first beam.

Step 502: the access network device sends at least one set of beam associating information to the terminal.

In an embodiment, the access network device may send the at least one set of beam associating information through dedicated signaling or broadcast signaling.

Step 503: the terminal receives the at least one set of beam associating information sent by the access network device.

Accordingly, the terminal may receive the at least one set of beam associating information through dedicated signaling or broadcast signaling.

Step 504: the terminal selects the first beam associated with the second beam as a beam for receiving the downlink control channel when the downlink data channel is received through the second beam.

For example, a beam sent by the access network device may be as shown in FIG. 2, and the access network device transmits the downlink data channel through the second beam (beam 1 to beam 4) and transmits the downlink control channel through the first beam (beam 5 and beam 6). When the terminal is receiving the downlink data channel through beam 1, if the terminal needs to receive the downlink control channel, it does not have to separately perform measurements on beam 5 and beam 6. Rather, it may directly select a first beam associated with beam 1, i.e., beam 5, according to the received beam associating information, and receive the downlink control channel through beam 5.

In summary, in the beam selection method provided by the embodiment of the present disclosure, the access network device transmits the downlink data channel through the second beam, transmits the downlink control channel through the first beam, and notifies the terminal the association relation between the first beam and the second sent by the access network device, when the terminal receives the downlink data channel transmitted by the access network device through the second beam, if the downlink control channel needs to be received, the terminal may receive the downlink control channel directly through the first beam associated with the second beam according to the association relation between the first beam and the second beam, without having to perform measurements on each first beam sent by the access network device, thereby reducing the steps of measuring the signal quality of the beam during the process of receiving the downlink control channel.

Figure 6:
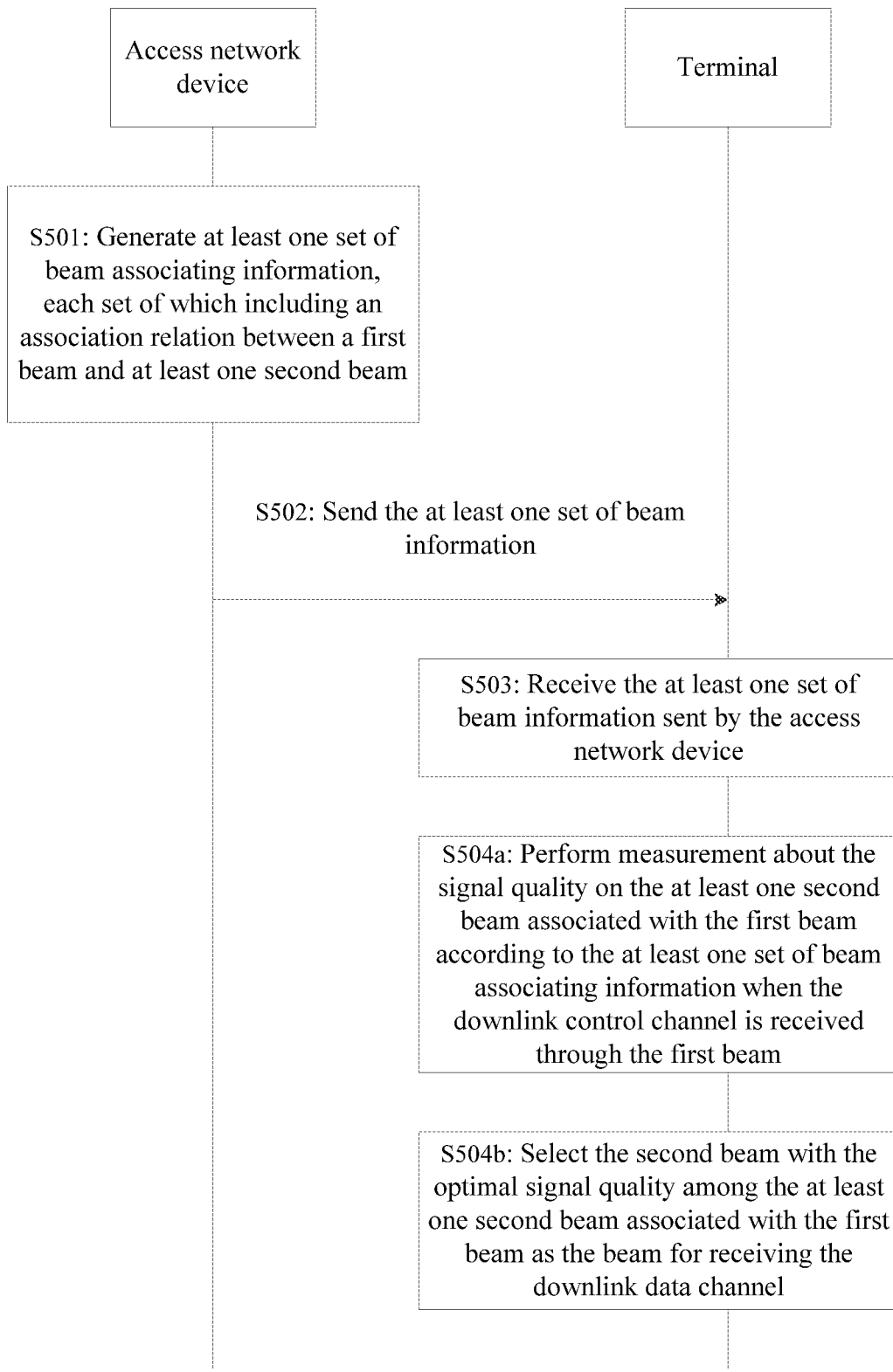
FIG. 6 is a flowchart of yet another beam selection method according to an embodiment of the present disclosure.

In an alternative embodiment based on FIG. 5, the terminal may also select a second beam for receiving the downlink data channel through an association relation between the first beam and the second beam sent by the access network device. In this instance, Step 504 can alternatively be implemented as step 504a and step 504b, as shown in FIG. 6.

Step 504a: the terminal performs measurement about signal quality of the at least one second beam associated with the first beam according to the at least one set of beam associating information when the downlink control channel is received through the first beam.

For example, the beam sent by the access network device is as shown in FIG. 2, and the access network device transmits the downlink data channel through the second beam (beam 1 to beam 4) and transmits the downlink control channel through the first beam (beam 5 and beam 6). When the terminal is receiving the downlink control channel through beam 5, if the terminal needs to receive the downlink data channel, it may select the second beam (beam 1 and beam 2) associated with beam 5 to perform measurement about signal quality according to the received beam associating information, without having to measure the signal quality of beam 3 and beam 4, separately.

Step 504b: the terminal selects the second beam with the optimal signal quality among the at least one second beam associated with the first beam as the beam for receiving the downlink data channel.

For example, after performing measurements about the signal quality on beam 1 and beam 2, respectively, the terminal selects the beam with the optimal signal quality among beam 1 and beam 2 to receive the downlink data channel.

In summary, in the beam selection method provided by the embodiment of the present disclosure, the access network device transmits the downlink data channel through the second beam, transmits the downlink control channel through the first beam, and notifies the terminal the association relation between the first beam and the second beam sent by the access network device. When the terminal receives the downlink data channel transmitted by the access network device through the first beam, if a downlink control channel needs to be received, the terminal only have to perform measurement on the second beam associated with the first beam according to the association relation between the first beam and the second beam, rather than all the second beam sent by the access network device, thereby reducing the number of measurements to be performed about the signal quality of the beam during the process of receiving the downlink control channel.

Figure 7:
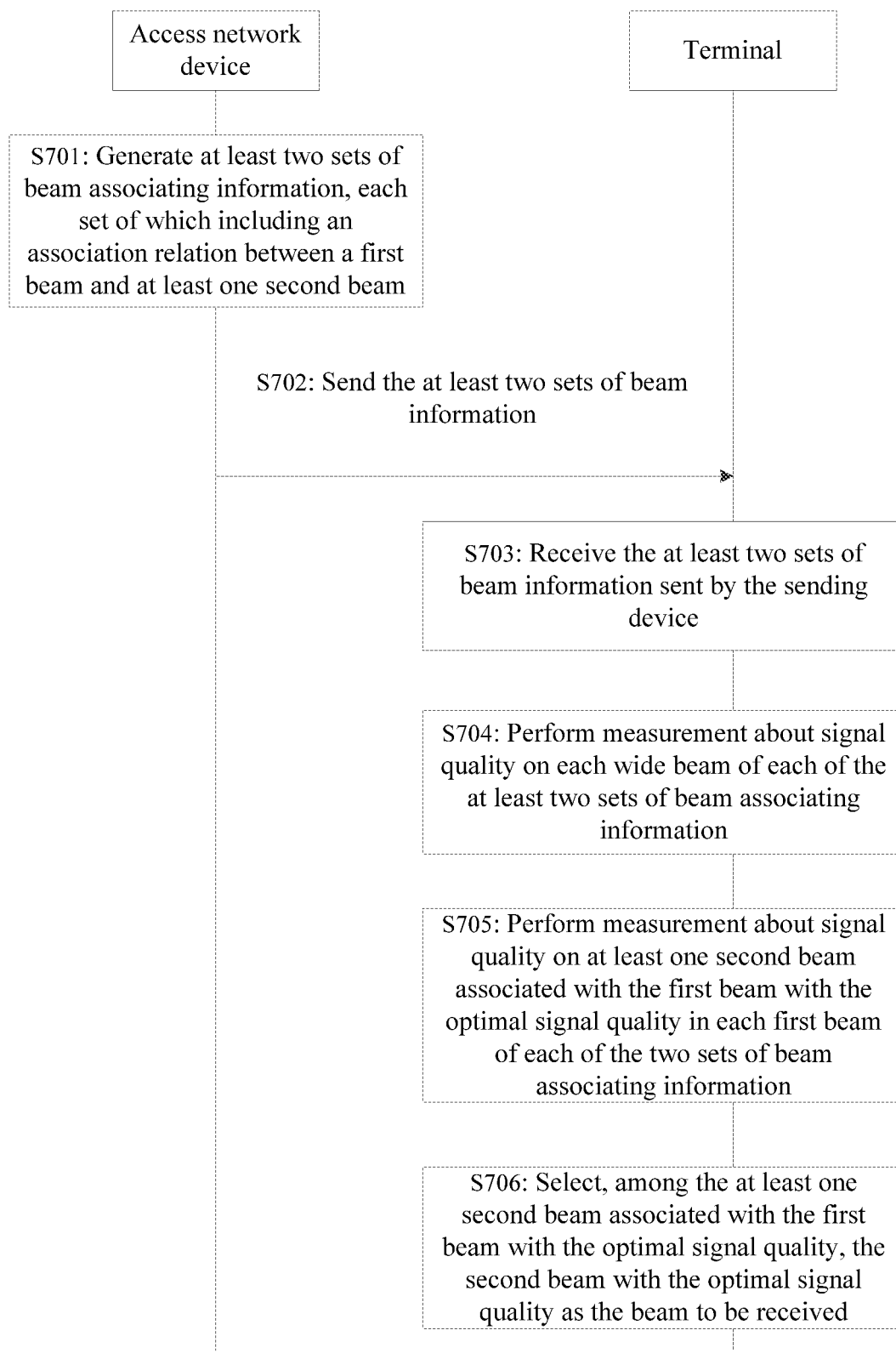
FIG. 7 is a flowchart of yet another beam selection method according to an embodiment of the present disclosure.

Please refer to FIG. 7, which is a flowchart of a beam selection method according to an embodiment of the present disclosure. In this embodiment, the beam selection method is applied to the mobile communication system shown in FIG. 1, where the sending device is an access network device, and the receiving device is a terminal. The method includes:

Step 701: the access network device generates at least two sets of beam associating information, each set of beam associating information including an association relation between a first beam and at least one second beam.

In the embodiment of the present disclosure, the first beam does not have to be any specific downlink physical channel. For example, the different downlink physical channel can be transmitted through any of the first beam or the second beam.

Or, similar to the embodiment shown in FIG. 5 or FIG. 6, in the embodiment of the present disclosure, the first beam and the second beam may also be used to transmit different downlink physical channels, respectively.

Step 702: the access network device sends the generated at least two sets of beam associating information to the terminal.

In an embodiment, the access network device may send the at least one set of beam associating information through dedicated signaling or broadcast signaling.

Step 703: the terminal receives the at least two sets of beam information sent by the sending device.

Accordingly, the terminal may receive the at least one set of beam associating information through dedicated signaling or broadcast signaling.

Step 704: the terminal performs measurement about signal quality of each first beam of each of the at least two sets of beam associating information.

For example, the beam sent by the access network device is as shown in FIG. 3, and the access network device sends nine second beams, i.e., beam 1 to beam 9. When the terminal needs to receive the signaling or data sent by the access network device through a second beam, the second beam with the optimal signal quality needs to be selected from beam 1 to beam 9. In the solution shown in the embodiment of the present disclosure, after receiving the beam associating information sent by the access network device, the terminal may firstly perform measurements on the three first beams associated with the nine second beams when selecting the received second beam, i.e., perform measurements about the signal quality of beam 10, beam 11 and beam 12 in FIG. 3.

Step 705: the terminal performs measurement about signal quality of at least one second beam associated with the first beam with the optimal signal quality in the first beam of each of the two sets of beam associating information.

After measuring the signal quality of beam 10, beam 11 and beam 12 in FIG. 3, the terminal determines the first beam with the optimal signal quality. For example, assuming that the first beam with the optimal signal quality is the beam 11, further, the terminal performs signal quality measurement on the three second beams (i.e., beam 4 to beam 6) associated with beam 11.

Step 706: the terminal selects, among the at least one second beam associated with the first beam with the optimal signal quality, the second beam with the optimal signal quality as a beam to be received.

Specifically, the terminal may select, in the at least one second beam associated with the first beam with the optimal signal quality, the second beam with the optimal signal quality as a beam for receiving data or signaling sent by the access network device.

For example, after measuring the signal quality of the second beam associated with the first beam with the optimal signal quality (i.e., beam 4 to beam 6 in FIG. 3), the terminal may select the beam with the optimal signal quality in the received beam 4 to beam 6, and receives data or signaling sent by the access network device through the selected beam.

For example, taking the beam associating information including the association relation between the reference signal of the first beam and the reference signal of each of the associating second beam as an example, the terminal may measure the signal quality of beam 10, beam 11 and beam 12 according to the reference signals of beam 10, beam 11 and beam 12. After determining that beam 11 has the optimal signal quality among the three beams, a query may be performed to obtain the association relation between the reference signal of beam 11 and the reference signal of beam 4 to beam 6, According to the reference signals of beam 4 to beam 6, the signal quality of beam 4 to beam 6 is measured, and the second beam with the optimal signal quality is selected therefrom.

In the above process of the embodiment of the present disclosure, when selecting a second beam from the nine second beams shown in FIG. 3, the terminal only needs to measure the three first beams first, and then measure the signal quality of the three second beams associated with the first beam with the optimal signal quality, and can determine the received second beam through six measurements before and after without measuring the nine second beams separately.

In summary, in the beam selection method provided by the embodiment of the present disclosure, the access network device notifies the terminal of the association relation between the first beam and the second beam sent by the access network device; when selecting a second beam from the second beams sent by the access network device for receiving, the terminal only needs to perform measurements on individual first beams sent by the access network device and then on the second beam associated with the first beam with the optimal signal quality to determine the second beam to be received, without having to separately perform measurements on all the second beams sent by the access network device, thereby reducing the number measurements to be performed about the signal quality of the beam during the process of receiving data or signaling through the second beam.

The solution shown in FIG. 5 to FIG. 7 is described by way of example illustrating the sending device as the access network device and the receiving device as the terminal. The beam selection method provided by the present disclosure is also applicable to the case where the access network device selects a beam sent by the terminal.

Figure 8:
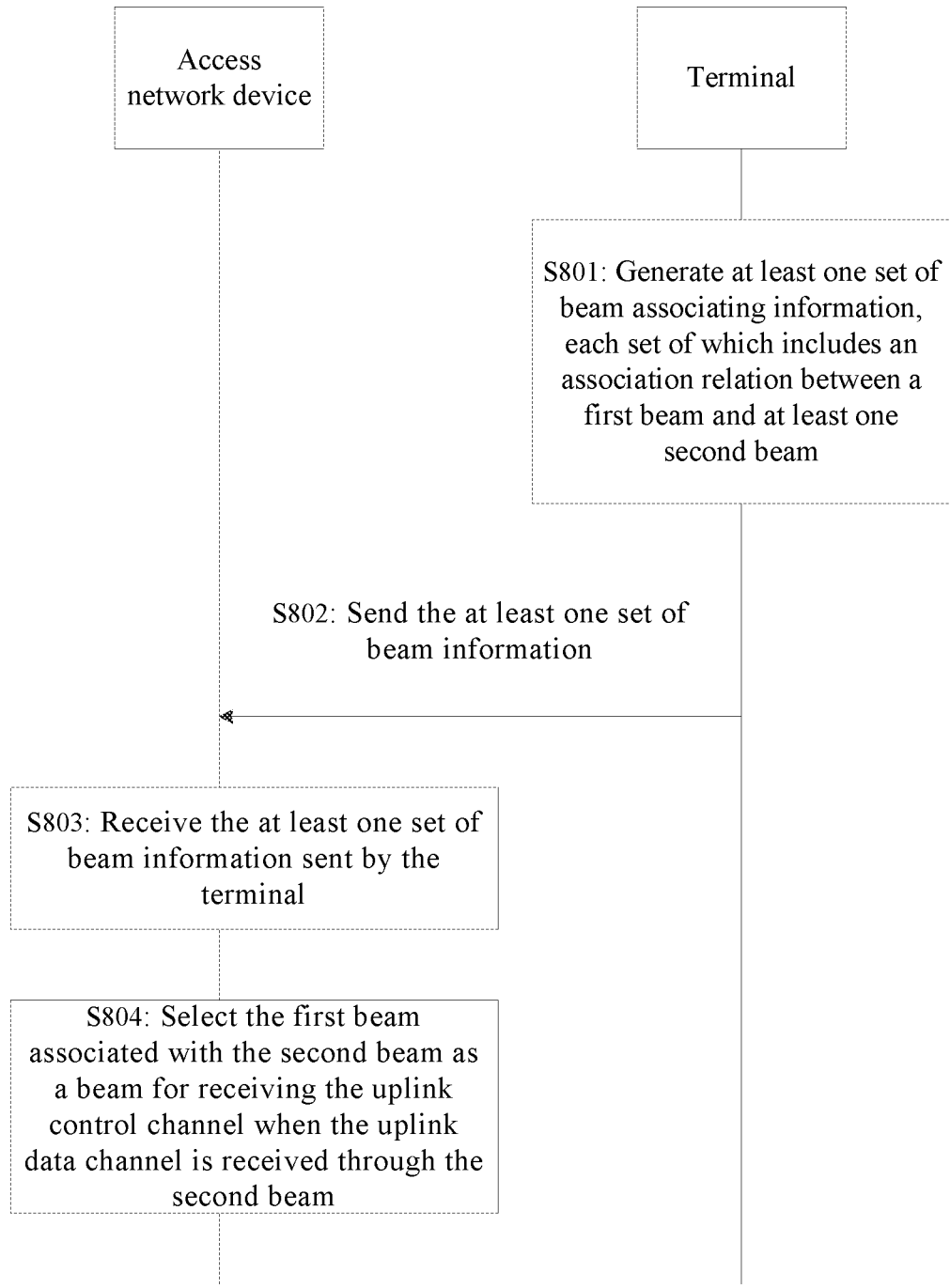
FIG. 8 is a flowchart of yet another beam selection method according to an embodiment of the present disclosure.

Please refer to FIG. 8, which is a flowchart of a beam selection method according to an embodiment of the present disclosure. This embodiment will be illustrated by way of example, in which the beam selection method is applied to the mobile communication system as shown in FIG. 1, the sending device is a terminal, the receiving device is an access network device, and the terminal sends an uplink data channel through the second beam, and sends an uplink control channel through the first beam. The method includes the following.

Step 801: the terminal generates at least one set of beam associating information, where each set of beam associating information includes an association relation between a first beam and at least one second beam.

In an embodiment of the present disclosure, the association relation between the first beam and the at least one second beam further includes an uplink data channel associated with the at least one second beam, and an uplink control channel associated with the first beam.

Or, the association relation between the first beam and the at least one second beam may also include an identifier or a channel type of the uplink physical channel associated with the at least one second beam, and an identifier or channel type of the uplink physical channel associated with the first beam.

Step 802: the terminal sends at least one set of beam information to the access network device.

In an embodiment, the terminal sending the at least one set of beam associating information through dedicated signaling, such as RRC signaling.

Step 803: the access network device receives at least one set of beam information sent by the terminal.

Accordingly, the access network device receiving the at least one set of beam associating information sent by the terminal through dedicated signaling.

Step 804: the access network device selects the first beam associated with the second beam as a beam for receiving the uplink control channel when the uplink data channel is received through the second beam.

For example, the beam transmitted by the terminal may be as shown in FIG. 2, and the terminal transmits the uplink data channel through the second beam (beam 1 to beam 4), and transmits the uplink control channel through the first beam (beam 5 and beam 6). When the access network device is receiving the uplink data channel through beam 1 (i.e., the second beam), if the access network device needs to receive the uplink control channel, rather than having to measure the beam 5 and the beam 6 separately, it may go straight to select the first beam (beam 5) associated with beam 1 according to the received beam associating information and receive the uplink control channel through beam 5.

In summary, in the beam selection method provided by the embodiment of the present disclosure, the terminal transmits the uplink data channel through the second beam, transmits the uplink control channel through the first beam, and notifies the access network device of the association relation between the first beam and the second sent by the terminal; when the access network device receives the uplink data channel transmitted by the terminal through the second beam, if the uplink control channel needs to be received, the access network device may directly receive the uplink control channel through the first beam associated with the second beam according to the association relation between the first beam and the second beam, without having to perform measurements on each first beam sent by the access network device, thereby reducing the steps of measuring the signal quality of the beam during the process of receiving the uplink control channel.

In an alternative embodiment based on FIG. 8, the terminal may also select a second beam for receiving the downlink data channel through an association relation between the first beam and the second beam sent by the access network device. In this instance, Step 804 can alternatively be implemented as Step 804a and Step 804b, as shown in FIG. 6:

Step 804a: the access network device performs measurement about signal quality of the at least one second beam associated with the first beam according to the at least one set of beam associating information when the uplink control channel is received through the first beam.

For example, the beam sent by the access network device is as shown in FIG. 2, and the terminal transmits the downlink data channel through the second beam (beam 1 to beam 4) and transmits the downlink control channel through the first beam (beam 5 and beam 6). When the access network device receives the downlink control channel through beam 5, if the downlink data channel needs to be received, the access network device may select the second beam (beam 1 and beam 2) associated with beam 5 to perform measurement of signal quality according to the received beam associating information, without having to measure the signal quality of beam 3 and beam 4 separately.

Step 804b: the access network device selects the second beam with the optimal signal quality among the at least one second beam associated with the first beam as the beam for receiving the uplink data channel.

For example, as shown in FIG. 2, after performing signal quality measurement on beam 1 and beam 2, respectively, the access network device selects to receive the uplink data channel through the beam with the optimal signal quality in beam 1 and beam 2.

In summary, in the beam selection method provided by the embodiment of the present disclosure, the terminal transmits the downlink data channel through the second beam, transmits the downlink control channel through the first beam, and notifies the access network device the association relation between the first beam and the second sent by the terminal; when the access network device receives the uplink data channel transmitted by the terminal through the first beam, if the uplink control channel needs to be received, the access network device can simply perform measurement on the second beam associated with the first beam according to the association relation between the first beam and the second beam, without having to perform measurement on all the second beam sent by the terminal, thereby reducing the number of measurements about the signal quality of the beam during the process of receiving the uplink control channel.

Figure 10:
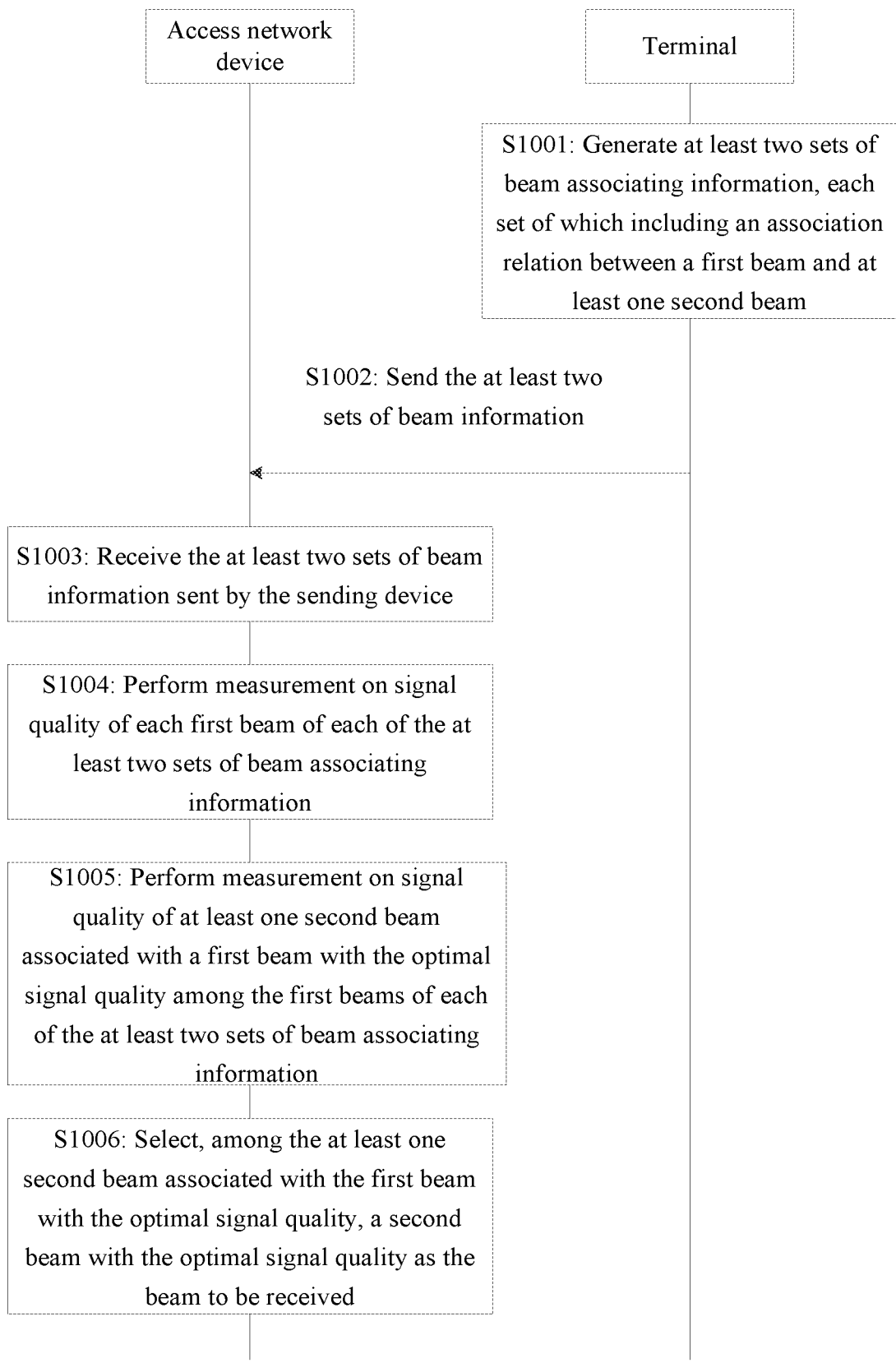
FIG. 10 is a flowchart of yet another beam selection method according to an embodiment of the present disclosure.

Please refer to FIG. 10, which is a flowchart of a beam selection method according to an embodiment of the present disclosure. In this embodiment, the beam selection method is applied to the mobile communication system as shown in FIG. 1, where the sending device is a terminal, and the receiving device is an access network device. The method includes the following.

Step 1001: the terminal generates at least two sets of beam associating information, each set of beam associating information including an association relation between a first beam and at least one second beam.

In the embodiment of the present disclosure, the first beam may not correspond to a specific downlink physical channel. For example, different downlink physical channels can be transmitted through the first beam or the second beam.

Figure 9:
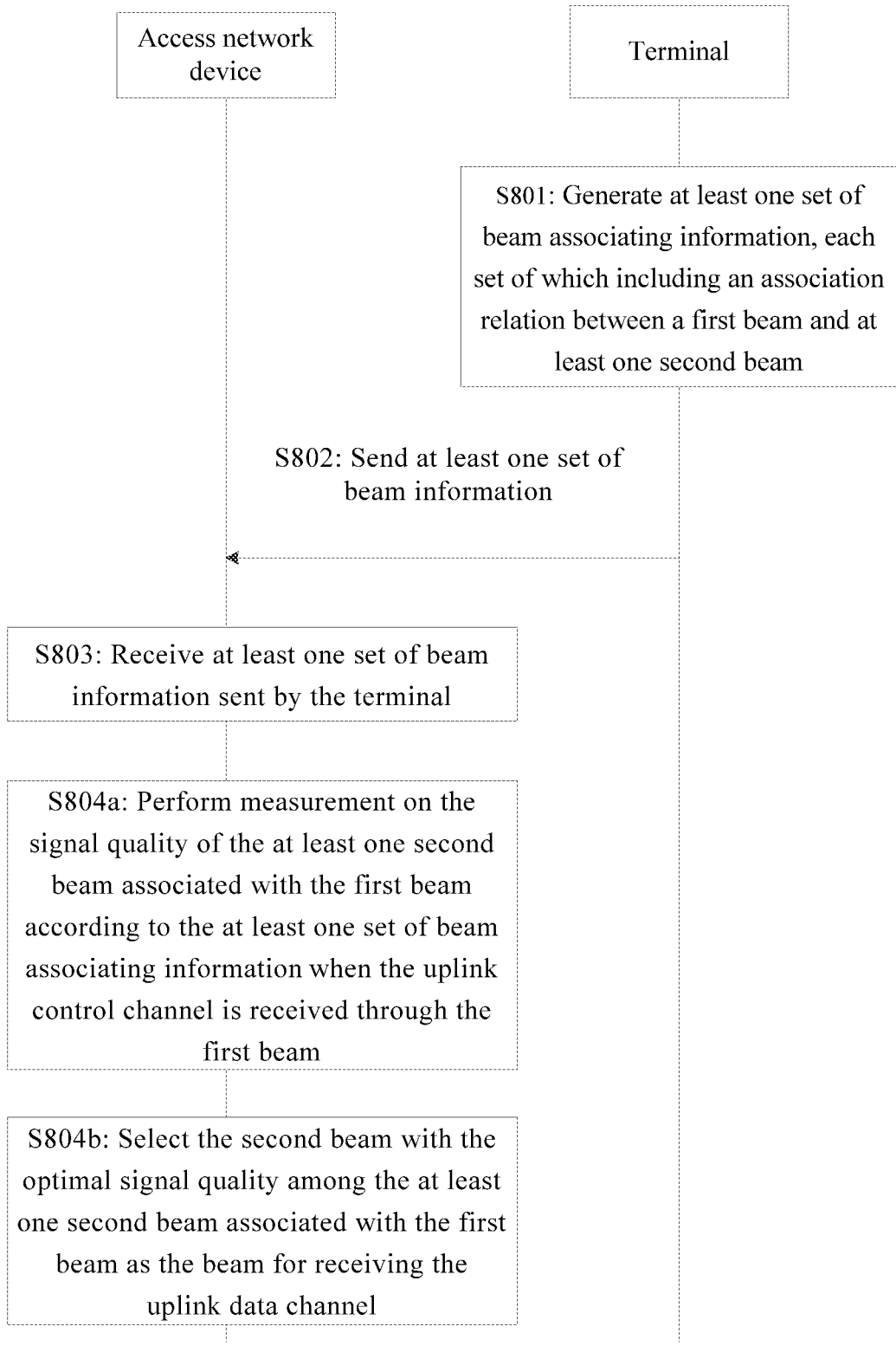
FIG. 9 is a flowchart of yet another beam selection method according to an embodiment of the present disclosure.

Alternatively, similar to the embodiment shown in FIG. 8 or FIG. 9, in the embodiment of the present disclosure, the first beam and the second beam may also be used to transmit different downlink physical channels, respectively.

Step 1002: the terminal sends the generated at least two sets of beam information to the terminal.

In an embodiment, the terminal sending the at least one set of beam associating information through dedicated signaling.

Step 1003: the access network device receives the at least two sets of beam information sent by the sending device.

Accordingly, the access network device receiving the at least one set of beam associating information through dedicated signaling.

Step 1004: the access network device performs measurement about signal quality of the first beam of each of the at least two sets of beam associating information.

For example, the beam sent by the terminal is as shown in FIG. 3, and the terminal transmits the nine second beams of beam 1 to beam 9. When the access network device needs to receive the signaling or data sent by the terminal through the second beam, the second beam with the optimal signal quality needs to be selected from beam 1 to beam 9. In the solution shown in the embodiment of the present disclosure, the access network device may first measure the three first beams associated with the nine second beams when selecting the second beam, i.e. measure the signal quality of beam 10, beam 11 and beam 12 in FIG. 3.

Step 1005: the access network device performs measurement about signal quality of at least one second beam associated with the first beam with the optimal signal quality in the first beam of each of the two sets of beam associating information.

After measuring the signal quality of beam 10, beam 11 and beam 12 in FIG. 3, the access network device determines the first beam with the optimal signal quality, for example, assuming that the first beam with the optimal signal quality is the beam 11, further, the access network device performs signal quality measurement on the three second beams (i.e., beam 4 to beam 6) associated with beam 11.

Step 1006: the access network device selects in the at least one second beam associated with the first beam with the optimal signal quality, the second beam with the optimal signal quality as the received beam.

Specifically, the access network device may select, in the at least one second beam associated with the first beam with the optimal signal quality, the second beam with the optimal signal quality as a beam for receiving data or signaling sent by the terminal.

For example, after the access network device measures the signal quality of beam 4 to beam 6 in FIG. 3, the beam with the optimal signal quality in beam 4 to beam 6 is selected as the beam for receiving data or signaling.

In the above process of the embodiment of the present disclosure, when selecting a second beam from the nine second beams shown in FIG. 3, the access network device only needs to measure the three first beams first, and then measure the signal quality of the three second beams associated with the first beam with the optimal signal quality, and can determine the received second beam through six measurements before and after without measuring the nine second beams separately.

In summary, in the beam selection method provided by the embodiment of the present disclosure, the terminal notifies the access network device of the association relation between the first beam and the second beam sent by the terminal, when selecting a second beam from the second beams sent by the terminal for receiving, the access network device only needs to measure each of the first beams sent by the terminal, and then measure the second beam associated with the first beam with the optimal signal quality, and determine the received second beam without separately measuring all the second beams sent by the terminal, thereby reducing the number of times of measuring the signal quality of the beam during the process of receiving data or signaling through the second beam.

It should be noted that, in the foregoing embodiments shown in FIG. 5 to FIG. 10, the steps performed by the access network device may be separately implemented as a beam selection method on the access network device side, and the steps performed by the terminal in each of the foregoing embodiments shown in FIG. 5 to FIG. 10 may be separately implemented as a beam selection method on the terminal side.

Figure 11:
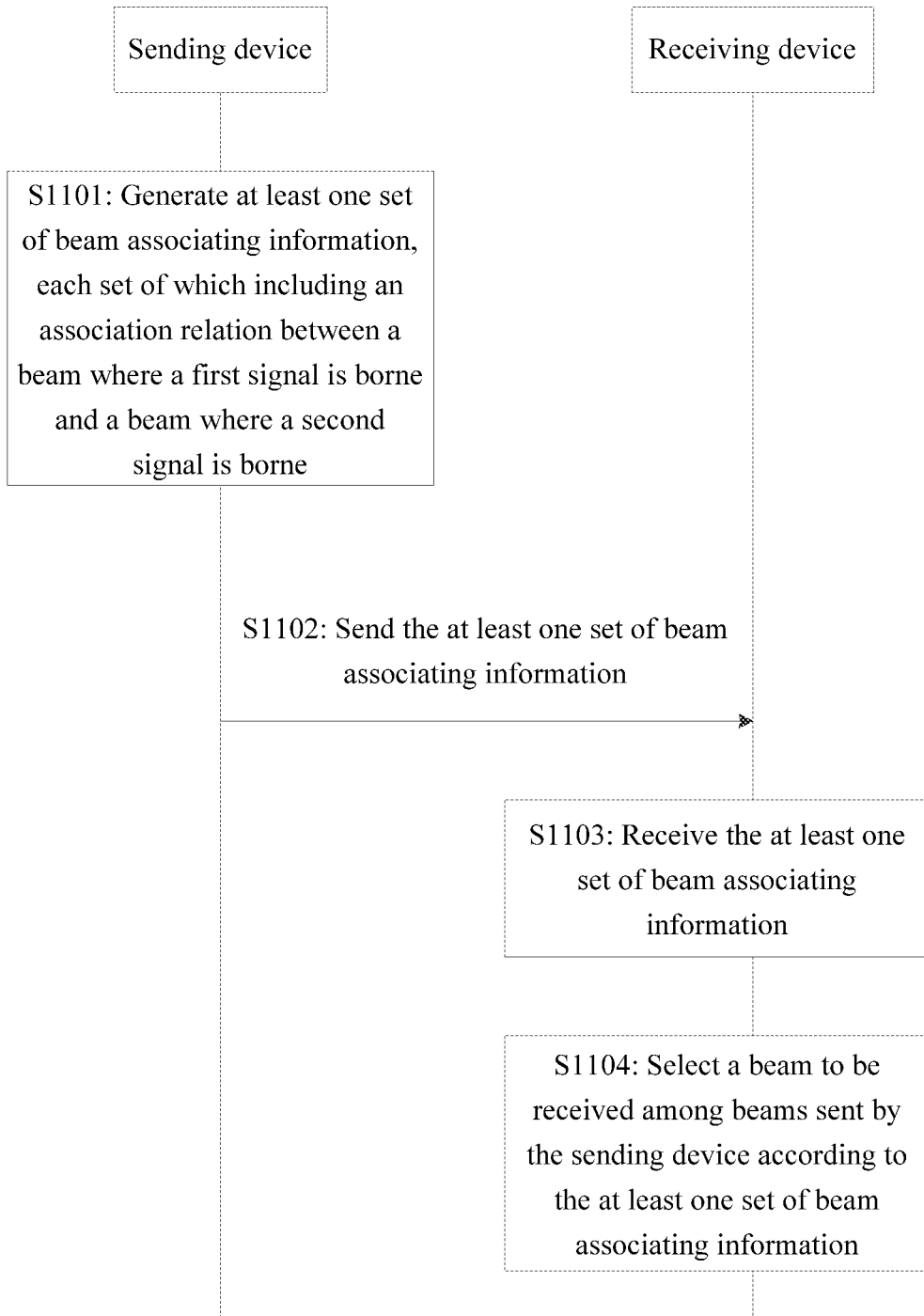
FIG. 11 is a flowchart of yet another beam selection method according to an embodiment of the present disclosure.

Please refer to FIG. 11, which is a flowchart of a method of a beam selection method according to an embodiment of the present disclosure. This embodiment is exemplified by applying the beam selection method to the mobile communication system shown in FIG. 1. The method includes:

Step 1101: a sending device generates at least one set of beam associating information, where each set of beam associating information includes an association relation between a beam where a first signal is borne and a beam where a second signal is borne.

In an embodiment, the beam where the first signal is borne is the same beam as the beam where the second signal is borne.

In the embodiment of the present disclosure, when the sending device performs multi-beam sending by using the beamforming technology, different signals belonging to the same type may be sent on different beams, and multiple signals of different types may be sent on the same beam. The sending device may generate a set of beam associating information according to the first signal and the second signal on each beam sent by the sending device.

For example, taking FIG. 2 as an example, where beam 1 to beam 4 each sends a first signal and a second signal, wherein the first signal sent in beam 1 is signal 11 and the second signal sent in beam 1 is 21, the first signal sent in beam 2 is signal 12, and the second signal sent in beam 2 is 22, the first signal sent in beam 3 is signal 13, and the second signal sent in beam 3 is 23, the first signal sent in beam 4 is signal 14 and the second signal sent in beam 4 is 24. The set of beam associating information associated with beam 1 includes the association relation between the beam where the signal 11 is borne and the beam where the signal 21 is borne. Accordingly, the set of beam associating information associated with beam 2 includes association relation between the beam where the signal 12 is borne and the beam where the signal 22 is borne, the set of beam associating information associated with beam 3 includes the association relation between the beam where the signal 13 is borne and the beam where the signal 23 is borne, and the set of beam associating information associated with beam 4 includes the association relation between the beam where the signal 14 is borne and the beam where the signal 24 is borne.

The relation between the beam where the first signal is borne and the beam where the second signal is borne may directly be the association relation between the signal content of the first signal and the signal content of the second signal, or may be the association relation between the identifier of the first signal and the identifier of the second signal, or may be the association relation between the signal content of the first signal and the identifier of the second signal, or may be the association relation between the identifier of the first signal and the signal content of the second signal and so on.

Step 1102: the sending device sends, at least one set of beam associating information to the receiving device.

In the embodiment of the present disclosure, the sending device may send the beam associating information through a Quasi Co-Located (QCL) parameter, that is, the sending device sends a Quasi Co-Located parameter indicating the at least one set of beam associating information to the receiving device.

Or,

In the embodiment of the present disclosure, the sending device may also send the beam associating information through dedicated signaling, that is, the sending device sends the dedicated signaling including the at least one set of beam associating information to the receiving device, such as radio resource control (RRC) signaling.

Step 1103: the receiving device receives the at least one set of beam associating information.

Accordingly, when the sending device can send the beam associating information through the Quasi Co-Located parameter, the receiving device receives the Quasi Co-Located parameter sent by the sending device, and obtains at least one set of beam associating information indicated by the Quasi Co-Located parameter.

Or,

When the sending device sends the beam associating information through the dedicated signaling, the receiving device receives at least one set of beam associating information sent by the sending device through the dedicated signaling.

Step 1104: the receiving device selects, a beam to be received among beams sent by the sending device according to the at least one set of beam associating information.

Specifically, in the embodiment of the present disclosure, the receiving device can obtain the signal quality of each beam obtained by performing measurement on the first signal in each beam; the receiving device queries each second signal associated with the first signal in the beam with the optimal signal quality according to at least one set of beam associating information; the receiving device selects the beam with the optimal signal quality as the beam for receiving the second signal associated with the first signal in the beam with the optimal signal quality.

With the method shown in the embodiment of the present disclosure, the receiving device may perform measurement on the first signal in each beam sent by the sending device to obtain the signal qualities of the respective beams, so as to subsequently directly query to determine which signal is the second signal carried in the beam with the strongest signal according to the received beam associating information while receiving the second signal, thereby receiving the determined second signal directly through the beam with the strongest signal, without beam scanning for the second signal.

In summary, in the method shown in the embodiment of the present disclosure, when the receiving device needs to receive the second signal after performing measurement on the first signal, the receiving device does not need to measure the second signal, and can directly select the beam for receiving according to the beam associating information, thereby reducing the steps or times of measuring various signals in the beam, thereby reducing the time taken for beam measurement, accelerating the process of beam measurement and selection of the receiving device, and simplifying system complexity, reducing the latency of data reception.

It should be noted that the steps performed by the receiving device in the foregoing embodiment shown in FIG. 11 may be separately implemented as a beam selection method on the receiving device side, and the steps performed by the sending device in the foregoing embodiments may be separately implemented as a beam selection method on the sending device side.

The 5G system can cover the entire cell through different beams, that is, each beam covers a smaller range, and the effect of multiple beams covering the entire cell is realized by sweeping in time. Different sync signal blocks (SS blocks) are transmitted on different beams, and the terminal can distinguish different beams by different SS blocks.

The terminal starts beam sweeping during the process of searching for the cell, and measures different SS blocks to obtain the optimal downlink beam (i.e., the beam with the optimal signal quality). When the terminal is in the idle mode, it also needs to select the beam with the optimal signal quality when listening to the paging channel/signal. When the terminal enters the connected state, the terminal may need to measure CSI-RS, different CSI-RS configurations correspond to different beams; similarly, at other times, the terminal may also need to measure the beam associated with the downlink DMRS. Since the terminal has already measured the SS block when doing the cell selection, the system can indicate the association relation between the SS block and the beams of other signals/channels by the solution shown in FIG. 4 above, and the beam selection process can be greatly simplified when selecting beams measuring other signals/channels.

Figure 12:
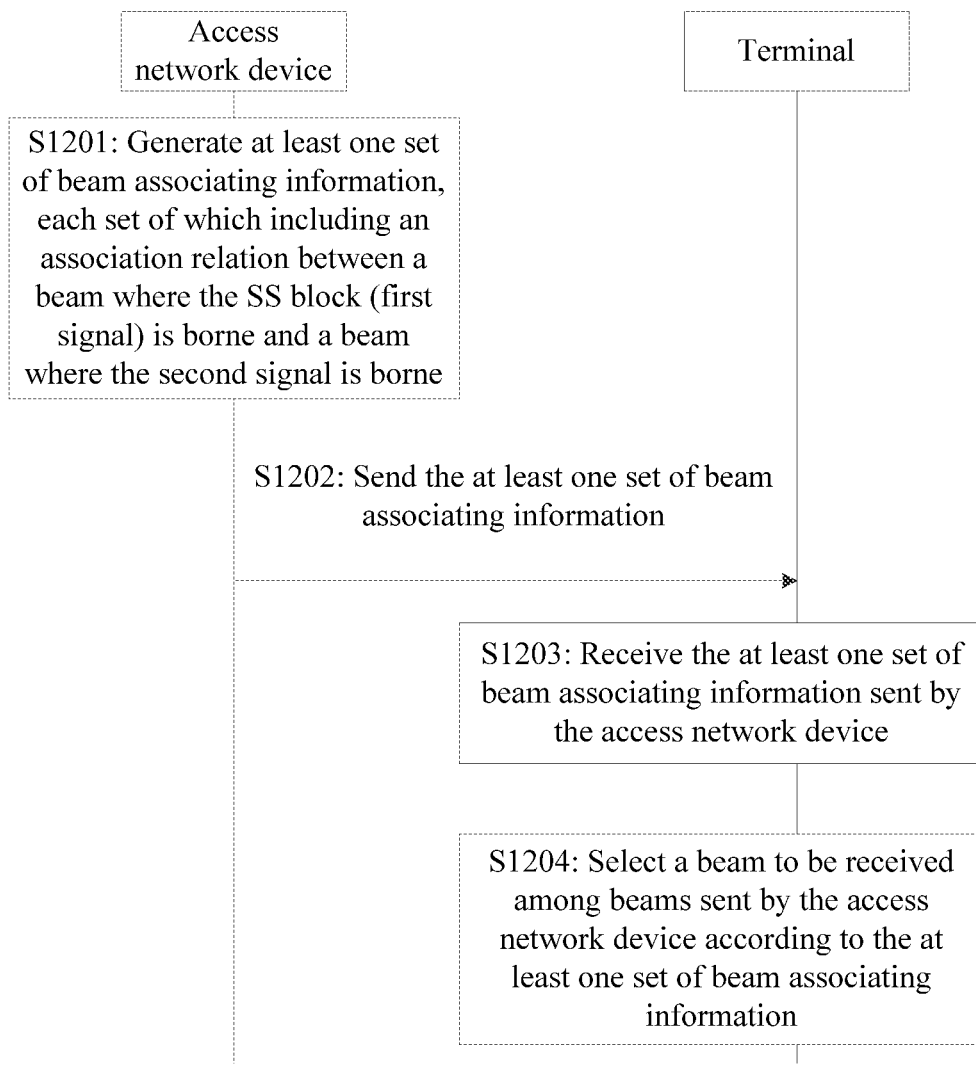
FIG. 12 is a flowchart of yet another beam selection method according to an embodiment of the present disclosure.

Please refer to FIG. 12, which is a flowchart of a method of a beam selection method according to an embodiment of the present disclosure. In this embodiment, the beam selection method is applied to the mobile communication system shown in FIG. 1, where the sending device is an access network device, and the receiving device is a terminal. The method includes:

Step 1201: the access network device generates, at least one set of beam associating information, where each set of beam associating information includes an association relation between a beam where the SS block (first signal) is borne and a beam where the second signal is borne.

In an embodiment, the beam where the first signal is borne is the same beam as the beam where the second signal is borne.

The first signal is a synchronization signal block (SS block); and the second signal includes at least one of a paging signal, a channel state information reference signal (CSI-RS), and a Demodulation Reference Signal (DMRS).

In the embodiment of the present disclosure, when the second signal includes a paging signal, the foregoing association relation may include: an association relation between the SS block and the paging channel/signal.

When the second signal includes a channel state information reference signal (CSI-RS), the association relation includes: an association relation between an SS block and a CSI-RS resource; and/or an association relation between an SS block and a CSI-RS port.

When the second signal includes a Demodulation Reference Signal (DMRS), the association relation includes: an association relation between an SS block and a DMRS port or port set.

Step 1202: the access network device sends at least one set of beam associating information to the terminal.

In the embodiment of the present disclosure, the access network device may send a system information block (SIB) to the terminal in a broadcast manner, and the QCL parameter carried in the SIB indicates the at least one set of beam associating information.

Or, the access network device may also send the at least one set of beam associating information to the terminal through dedicated signaling, such as RRC signaling.

Step 1203: the terminal receives, the at least one set of beam associating information.

Accordingly, when the access network device sends the beam associating information through the QCL parameter, the middle and high end receives the QCL parameter in the SIB sent by the access network device through broadcasts, and acquires at least one set of beam associating information indicated by the QCL parameter.

Or,

When the access network device sends the beam associating information through the RRC signaling, the terminal receives at least one set of beam associating information sent by the access network device through the RRC signaling.

Step 1204: the terminal selects a beam to be received among beams sent by the access network device according to the at least one set of beam associating information.

In the embodiment of the present disclosure, the terminal may acquire the signal quality of each beam obtained by measuring the SS block in each beam in advance, and query the second signal associated with the SS block in the beam with the optimal signal quality in each beam according to at least one set of beam associating information, and select the beam with the optimal signal quality as the beam for receiving the second signal associated with the SS block in the beam with the optimal signal quality.

After receiving the beam associating information generated and sent by the access network device, such as the QCL parameter, the terminal accelerates the beam selection process by using the association relation between SS bock and other signals/channels. Specifically, for example, the access network device broadcasts two SS blocks in a 20 ms period, and the access network device also uses two beams to broadcast paging messages. Meanwhile, the access network device indicates the association relation between the two SS blocks and the two beams broadcasting the paging message through the SIB. For example, the QCL parameters indicating SS block1 and paging message1 show that SS block1 and paging message1 are sent on the same beam, and the QCL parameters indicating SS block 2 and paging message 2 show that SS block 2 and paging message 2 are sent on another beam. The terminal finds that the signal quality in the beam direction associated with the SS block1 is the strongest when performs the cell search, the terminal can directly listen to the paging message1 in the beam direction associated with the SS block1 according to the above signal association relation. It does not need to perform beam scanning on paging message1 and paging message 2 first, and then determine to listen to paging message1 or paging message2 according to the result of beam scanning, thereby speeding up the process of beam selection by the terminal.

In summary, in the method shown in the embodiment of the present disclosure, the receiving device may perform measurement on the first signal in each beam sent by the sending device to obtain the signal qualities of the respective beams, so as to subsequently directly query to determine which signal is the second signal carried in the beam with the strongest signal according to the received signal association relation while receiving the second signal, thereby receiving the determined second signal directly through the beam with the strongest signal, without beam scanning for the second signal, thereby reducing the steps or times of measuring various signals in the beam, thereby reducing the time taken for beam measurement, accelerating the process of beam measurement and selection of the receiving device, and simplifying system complexity, reducing the latency of data reception.

The following is an apparatus embodiment of an embodiment of the present disclosure. For the parts that are not elaborated in the apparatus embodiment, reference may be made to the technical details disclosed in the foregoing method embodiments.

Figure 13:
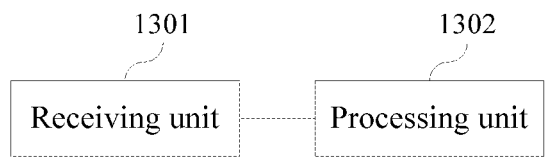
FIG. 13 is a structural block diagram of a beam selection apparatus according to another embodiment of the present disclosure.

Please refer to FIG. 13, which is a schematic structural diagram of a beam selection apparatus according to an embodiment of the present disclosure. The beam selection apparatus can be implemented as all or part of the receiving device by software, hardware, and a combination of both. The beam selection apparatus includes: a receiving unit 1301 and a processing unit 1302;

The receiving unit 1301 is configured to perform the foregoing step 403, step 503, step 703, step 803, step 1003, step 1103 or step 1203;

The processing unit 1302 is configured to perform the foregoing step 404, or to perform step 504, or to perform step 504a and step 504b, or to perform step 704 to step 706, or to perform step 804, or to perform steps 804a and 804b, or to perform steps 1004 to 1006, or to perform step 1104, or to perform step 1204.

Figure 14:
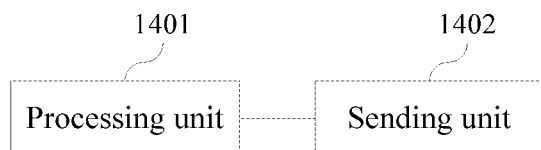
FIG. 14 is a structural block diagram of a beam selection apparatus according to another embodiment of the present disclosure.

Please refer to FIG. 14, which is a schematic structural diagram of a beam selection apparatus according to an embodiment of the present disclosure. The beam selection apparatus can be implemented as all or part of the sending device by software, hardware and a combination of both. The beam selection apparatus includes: a processing unit 1401 and a sending unit 1402;

The processing unit 1401 is configured to perform the foregoing step 401, step 501, step 701, step 801, step 1001, step 1101, or step 1201;

The sending unit 1402 is configured to perform the foregoing step 402, step 502, step 702, step 802 or step 1002, step 1102 or step 1202.

Figure 15:
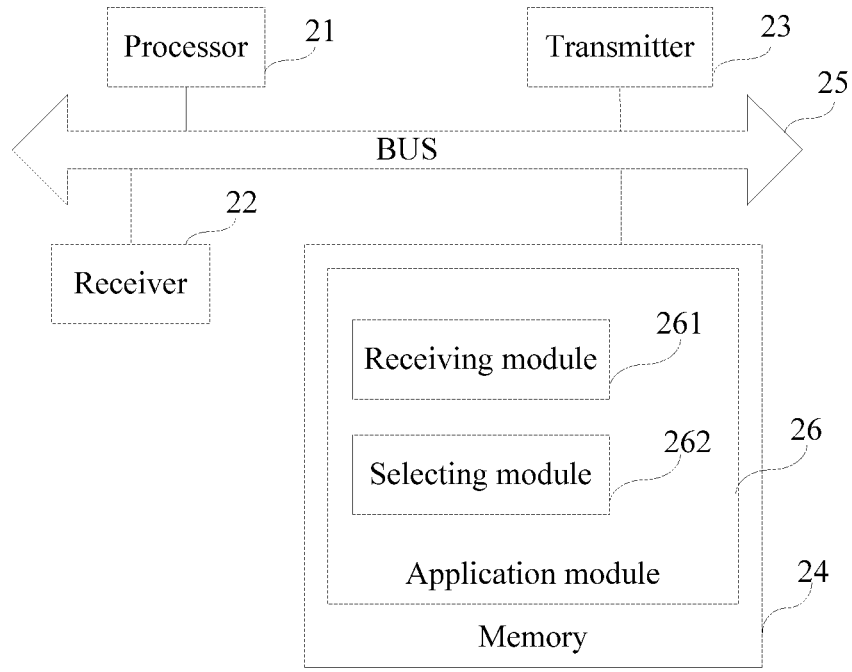
FIG. 15 is a structural block diagram of a receiving device according to another embodiment of the present disclosure.

Please refer to FIG. 15, which is a schematic structural diagram of a receiving device according to an exemplary embodiment of the present disclosure. The receiving device includes: a processor 21, a receiver 22, a transmitter 23, a memory 24, and a bus 25.

The processor 21 includes one or more processing cores, and the processor 21 executes various functional applications and information processing by running software programs and modules.

The receiver 22 and the transmitter 23 can be implemented as a communication component. The communication component can be a communication chip. The communication chip can include a receiving module, a sending module, a modem module, etc., for modulating and/or demodulating information, and receiving or sending the information via wireless signal.

The memory 24 is connected to the processor 21 via a bus 25.

The memory 24 can be used to store software programs and modules.

The memory 24 can store at least one of the application modules 26 described by the functions. The application module 26 can include a receiving module 261 and a selecting module 262.

The processor 21 is configured to execute the receiving module 261 to implement the functions related to the receiving step in the foregoing various method embodiments; the processor 21 is configured to execute the selecting module 262 to implement the functions related to the beam selecting step in the foregoing various method embodiments.

Moreover, memory 24 can be implemented by any type of volatile or non-volatile memory device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

Figure 16:
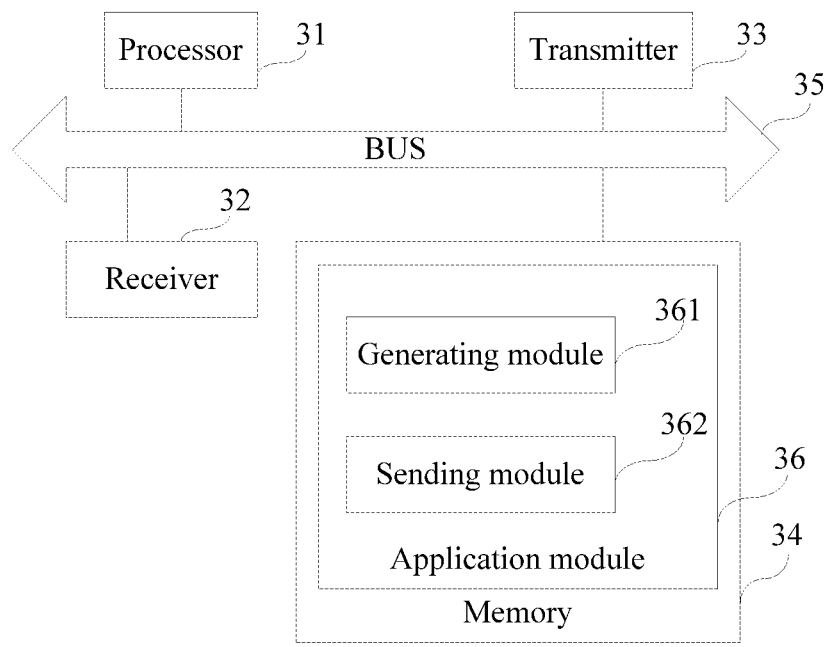
FIG. 16 is a structural block diagram of a sending device according to another embodiment of the present disclosure.

Please refer to FIG. 16, which is a schematic structural diagram of a sending device according to an exemplary embodiment of the present disclosure. The sending device includes a processor 31, a receiver 32, a transmitter 33, a memory 34, and a bus 35.

The processor 31 includes one or more processing cores, and the processor 31 executes various functional applications and information processing by running software programs and modules.

The receiver 32 and the transmitter 33 can be implemented as a communication component. The communication component can be a communication chip. The communication chip can include a receiving module, a sending module, a modem module, etc., for modulating and demodulating information, and receiving or sending the information via wireless signal.

The memory 34 is connected to the processor 31 via a bus 35.

The memory 34 can be used to store software programs and modules.

The memory 34 can store at least one of the application modules 26 described by the functions. The application module 36 can include a generating module 361 and a sending module 362.

The processor 31 is configured to execute the generating module 361 to implement the functions of the steps of generating beam associating information in the foregoing various method embodiments; the processor 31 is configured to execute the sending module 362 to implement the functions related to the sending step in the foregoing method embodiments;

Moreover, memory 34 can be implemented by any type of volatile or non-volatile memory device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The embodiment of the disclosure further provides a beam selection system, which can include a receiving device and a sending device.

The receiving device may include the beam selection apparatus provided in FIG. 13 above, and the sending device may be the beam selection apparatus provided in FIG. 14 above.

Or, the receiving device may be the receiving device provided in FIG. 15 above, and the sending device may be the sending device provided in FIG. 16 above.

Those skilled in the art should appreciate that in one or more of the above examples, the functions described in the embodiments of the present disclosure may be implemented in hardware, software, firmware, or any combination thereof. When implemented in software, the functions may be stored in a computer readable medium or transmitted as one or more instructions or code on a computer readable medium. Computer readable media includes both computer storage media and communication media, the communication media includes any medium that facilitates transfer of a computer program from one location to another. A storage medium may be any available media that can be accessed by a general purpose or special purpose computer.

The above are only the preferred embodiments of the present disclosure, and are not intended to limit the present disclosure. Any modification, equivalent substitution, improvement, etc., within the spirit and principle of the present disclosure, should be included in the protection scope of the present disclosure.

What is claimed is:

1. A beam selection method, comprising:

receiving, by a receiving device, at least one set of beam associating information sent by a sending device, each set of the beam associating information comprising an association relation between a first beam and at least one second beam, wherein the first beam overlaps the at least one second beam;

selecting, by the receiving device, according to the at least one set of beam associating information, a beam to be received among beams sent by the sending device;

sending, by the sending device, the at least one set of beam associating information to the receiving device, enabling the receiving device to select the first beam associated with a second beam as a beam for receiving the second physical channel according to the at least one set of beam associating information, when the receiving device receives the first physical channel through the second beam wherein the association relation between the first beam and the at least one second beam comprises:

a first physical channel associated with the at least one second beam, and a second physical channel associated with the first beam;

wherein the selecting, by the receiving device, according to the at least one set of beam associating information, a beam to be received among beams sent by the sending device comprises:

when the receiving device receives the first physical channel through a second beam, selecting the first beam associated with the second beam as a beam for receiving the second physical channel according to the at least one set of beam associating information;

wherein the sending, by the sending device, the at least one set of beam associating information to the receiving device, enables the receiving device to select a beam to be received among beams sent by the sending device according to the at least one set of beam associating information.

2. The method according to claim 1, wherein the association relation between the first beam and the at least one second beam further comprises at least one of:

an association relation between a beam ID of the first beam and a beam ID of the at least one second beam;

an association relation between a physical resource associated with the first beam and a physical resource associated with each of the at least one second beam; and an association relation between a reference signal associated with the first beam and a reference signal associated with each of the at least one second beam.

3. The method according to claim 2, wherein the reference signal comprises:

at least one of a demodulation reference signal (DMRS) used by an uplink physical channel of an associated beam transmission, and a channel sounding reference signal (SRS) used by an uplink physical channel of an associated beam transmission;

or, at least one of a demodulation reference signal (DMRS) used by a downlink physical channel of an associated beam transmission, a beam specific reference signal (RS) of an associated beam, and a channel state information-reference signal (CSI-RS) of an associated beam.

4. The method according to claim 1, wherein the receiving, by a receiving device, at least one set of beam associating information sent by a sending device comprises:

receiving, by the receiving device, the at least one set of beam associating information sent by the sending device through dedicated signaling or broadcast signaling.

5. The method according to claim 1, wherein:

the receiving device is a terminal, and the sending device is an access network device;

or, the receiving device is an access network device, and the sending device is a terminal.

6. A beam selection method, comprising:

generating, by a sending device, at least one set of beam associating information, wherein each set of the beam associating information comprises an association relation between a first beam and at least one second beam, wherein the first beam overlaps the at least one second beam;

sending, by the sending device, the at least one set of beam associating information to the receiving device, enabling the receiving device to select a beam to be received among beams sent by the sending device according to the at least one set of beam associating information;

wherein the association relation between the first beam and the at least one second beam further comprises:

a first physical channel associated with the at least one second beam, and a second physical channel associated with the first beam;

wherein the sending, by the sending device, the at least one set of beam associating information to the receiving device, enabling the receiving device to select a beam to be received among beams sent by the sending device according to the at least one set of beam associating information comprises:

sending, by the sending device, the at least one set of beam associating information to the receiving device, enabling the receiving device to select the first beam associated with a second beam as a beam for receiving the second physical channel according to the at least one set of beam associating information, when the receiving device receives the first physical channel through the second beam.

7. The method according to claim 6, wherein the association relation between the first beam and the at least one second beam further comprises at least one of:

an association relation between a beam ID of the first beam and a beam ID of the at least one second beam;

an association relation between a physical resource associated with the first beam and a physical resource associated with each of the at least one second beam; and an association relation between a reference signal associated with the first beam and a reference signal associated with each of the at least one second beam.

8. The method according to claim 7, wherein the reference signal comprises:

at least one of a demodulation reference signal (DMRS) used by an uplink physical channel of an associated beam transmission, and a channel sounding reference signal (SRS) used by an uplink physical channel of an associated beam transmission;

or, at least one of a demodulation reference signal (DMRS) used by a downlink physical channel of an associated beam transmission, a beam specific reference signal (RS) of an associated beam, and a channel state information-reference signal (CSI-RS) of an associated beam.

9. The method according to claim 6, wherein the sending, by the sending device, the at least one set of beam associating information to the receiving device, comprises:

sending, by the sending device, the at least one set of beam associating information to the receiving device through dedicated signaling or broadcast signaling.

10. The method according to claim 6, wherein:

the receiving device is a terminal, and the sending device is an access network device;

or, the receiving device is an access network device, and the sending device is a terminal.

11. A receiving device, comprising: a receiver and a processor, wherein:

the receiver is configured to receive at least one set of beam associating information sent by a sending device, each set of the beam associating information comprising an association relation between a first beam and at least one second beam, wherein the first beam overlaps the at least one second beam;

the processor is configured to select, according to the at least one set of beam associating information, a beam to be received among beams sent by the sending device;

sending, by the sending device, the at least one set of beam associating information to the receiving device, enabling the receiving device to select the first beam associated with a second beam as a beam for receiving the second physical channel according to the at least one set of beam associating information, when the receiving device receives the first physical channel through the second beam wherein the association relation between the first beam and the at least one second beam further comprises:

a first physical channel associated with the at least one second beam, and a second physical channel associated with the first beam;

wherein the processor is specifically configured to select the first beam associated with the second beam as a beam for receiving the second physical channel according to the at least one set of beam associating information when the first physical channel is received through a second beam;

wherein the sending, by the sending device the at least one set of beam associating information to the receiving device, enables the receiving device to select a beam to be received among beams sent by the sending device according to the at least one set of beam associating information.

12. The device according to claim 11, wherein the association relation between the first beam and the at least one second beam further comprises at least one of:
  an association relation between a beam ID of the first beam and a beam ID of the at least one second beam;
  an association relation between a physical resource associated with the first beam and a physical resource associated with each of the at least one second beam; and
  an association relation between a reference signal associated with the first beam and a reference signal associated with each of the at least one second beam.

13. The device according to claim 12, wherein the reference signal comprises:
  at least one of a demodulation reference signal (DMRS) used by an uplink physical channel of an associated beam transmission, and a channel sounding reference signal (SRS) used by an uplink physical channel of an associated beam transmission;
  or,
  at least one of a demodulation reference signal (DMRS) used by a downlink physical channel of an associated beam transmission, a beam specific reference signal (RS) of an associated beam, and a channel state information-reference signal (CSI-RS) of an associated beam.

14. The device according to claim 11, wherein:
  the receiver is specifically configured to receive the at least one set of beam associating information sent by the sending device through dedicated signaling or broadcast signaling.

15. The device according to claim 11, wherein:
  the receiving device is a terminal, and the sending device is an access network device;
  or,
  the receiving device is an access network device, and the sending device is a terminal.

16. A beam selection device, comprising: a processor and a transmitter;
  the processor is configured to generate at least one set of beam associating information, wherein each set of the beam associating information comprises an association relation between a first beam and at least one second beam, wherein the first beam overlaps the at least one second beam;
  the transmitter is configured to send the at least one set of beam associating information to the receiving device, enabling the receiving device to select a beam to be received among beams sent by the sending device according to the at least one set of beam associating information;
  sending, by the sending device, the at least one set of beam associating information to the receiving device, enabling the receiving device to select the first beam associated with a second beam as a beam for receiving the second physical channel according to the at least one set of beam associating information, when the receiving device receives the first physical channel through the second beam
  wherein the association relation between the first beam and the at least one second beam further comprises:
  a first physical channel associated with the at least one second beam, and a second physical channel associated with the first beam;
  wherein the transmitter is specifically configured to send the at least one set of beam associating information to the receiving device, enables the receiving device to select the first beam associated with a second beam as a beam for receiving the second physical channel according to the at least one set of beam associating information, when the receiving device receives the first physical channel through the second beam.

17. The device according to claim 16, wherein the association relation between the first beam and the at least one second beam further comprises at least one of:
  an association relation between a beam ID of the first beam and a beam ID of the at least one second beam;
  an association relation between a physical resource associated with the first beam and a physical resource associated with each of the at least one second beam; and
  an association relation between a reference signal associated with the first beam and a reference signal associated with each of the at least one second beam.

18. The device according to claim 17, wherein the reference signal comprises:
  at least one of a demodulation reference signal (DMRS) used by an uplink physical channel of an associated beam transmission, and a channel sounding reference signal (SRS) used by an uplink physical channel of an associated beam transmission;
  or,
  at least one of a demodulation reference signal (DMRS) used by a downlink physical channel of an associated beam transmission, a beam specific reference signal (RS) of an associated beam, and a channel state information-reference signal (CSI-RS) of an associated beam.

19. The device according to claim 16, wherein:
  the transmitter is specifically configured to send the at least one set of beam associating information to the receiving device through dedicated signaling or broadcast signaling.

20. The device according to claim 16, wherein:
  the receiving device is a terminal, and the sending device is an access network device;
  or,
  the receiving device is an access network device, and the sending device is a terminal.

* * * * *